United States Patent [19]

Kameyama et al.

[11] Patent Number: 5,416,516

[45] Date of Patent: May 16, 1995

[54] SOLID-STATE IMAGE PICKUP APPARATUS HAVING A DEFECT DETECTING MODE

[75] Inventors: Takashi Kameyama; Yuuji Ohba, both of Kanagawa, Japan

[73] Assignee: Sony Corporation, Tokyo, Japan

[21] Appl. No.: 31,103

[22] Filed: Mar. 12, 1993

[30] Foreign Application Priority Data

Mar. 16, 1992 [JP] Japan .................................. 4-058367

[51] Int. Cl.[6] .......................................... H04N 5/335
[52] U.S. Cl. .................................... 348/246; 348/247; 348/615
[58] Field of Search ............... 348/244, 246, 247, 616, 348/615, 264; H04N 5/335; 358/483, 482; 382/54

[56] References Cited

U.S. PATENT DOCUMENTS

| | | | |
|---|---|---|---|
| 4,701,784 | 10/1987 | Matsuoka et al. | 348/247 |
| 4,760,453 | 7/1988 | Hieda | 348/244 |
| 4,894,721 | 1/1990 | Matsuda . | |
| 5,113,246 | 5/1992 | Ninomiya et al. . | |
| 5,144,446 | 9/1992 | Sudo et al. | 348/246 |
| 5,159,457 | 10/1992 | Kawabata | 348/246 |
| 5,272,536 | 12/1993 | Sudo et al. | 348/247 |

FOREIGN PATENT DOCUMENTS

| | | |
|---|---|---|
| 0313278 | 4/1989 | European Pat. Off. . |
| 0439912 | 8/1991 | European Pat. Off. . |
| 2181020 | 4/1987 | United Kingdom . |
| 2191059 | 12/1987 | United Kingdom . |

OTHER PUBLICATIONS

Patent Abstracts of Japan vol. 9, No. 181 (E-331) (1904) 26 Jul. 1985 & JP-A-60 051 378 (Toshiba K.K.) 22 Mar. 1985.
Patent Abstracts of Japan vol. 10, No. 158 (E-409)(2214) 6 Jun. 1986 & JP-A-61 013 779 (Toshiba K.K. 22 Jan. 1986.
Patent Abstracts of Japan JP-A-62 186 671 (Canon Inc.).

*Primary Examiner*—Edward L. Coles, Sr.
*Assistant Examiner*—Kim Yen Vu
*Attorney, Agent, or Firm*—William S. Frommer; Alvin Sinderbrand

[57] ABSTRACT

A solid-state image pickup apparatus for use as a video camera has a defect detecting mode and an operation mode. The solid-state image pickup apparatus includes a solid-state image sensor having pixels arranged in rows and columns for producing an output signal representing a detected image. The solid-state image sensor operates in a field reading mode for reading electric charges from the pixels in approximately one field period such that the electric charges of the pixels of two adjacent rows are summed before being outputted from the solid-state image sensor, the summed electric charges being different in even- and odd-numbered fields, and also operates in a frame reading mode for reading electric charges from the pixels in approximately one frame period such that the electric charges of the pixels of one of two vertically adjacent rows are read in even-numbered fields and the electric charges of the pixels of the other of two adjacent rows are read in odd-numbered fields. The positions of defective pixels of the solid-state image sensor are detected in the defect detecting mode, the defective pixels causing noise in the output signal at corresponding times in sampled data of the output signal. The detected positions of the defective pixels are stored in a memory. When the defect detecting mode is selected, the solid-state image sensor is controlled to operate in the frame reading mode.

12 Claims, 25 Drawing Sheets

Odd — Numbered Field

Even — Numbered Field

Odd – Numbered Field

Even – Numbered Field

|  | | Temperature Dependency | |
|---|---|---|---|
|  | | Yes | No |
| Light Intensity Dependency | Yes | | W2 White Flaw Defect |
|  | | | B1 Black Flaw Defect |
|  | No | W1 | |
|  | | | B2 Black Flaw Defect |

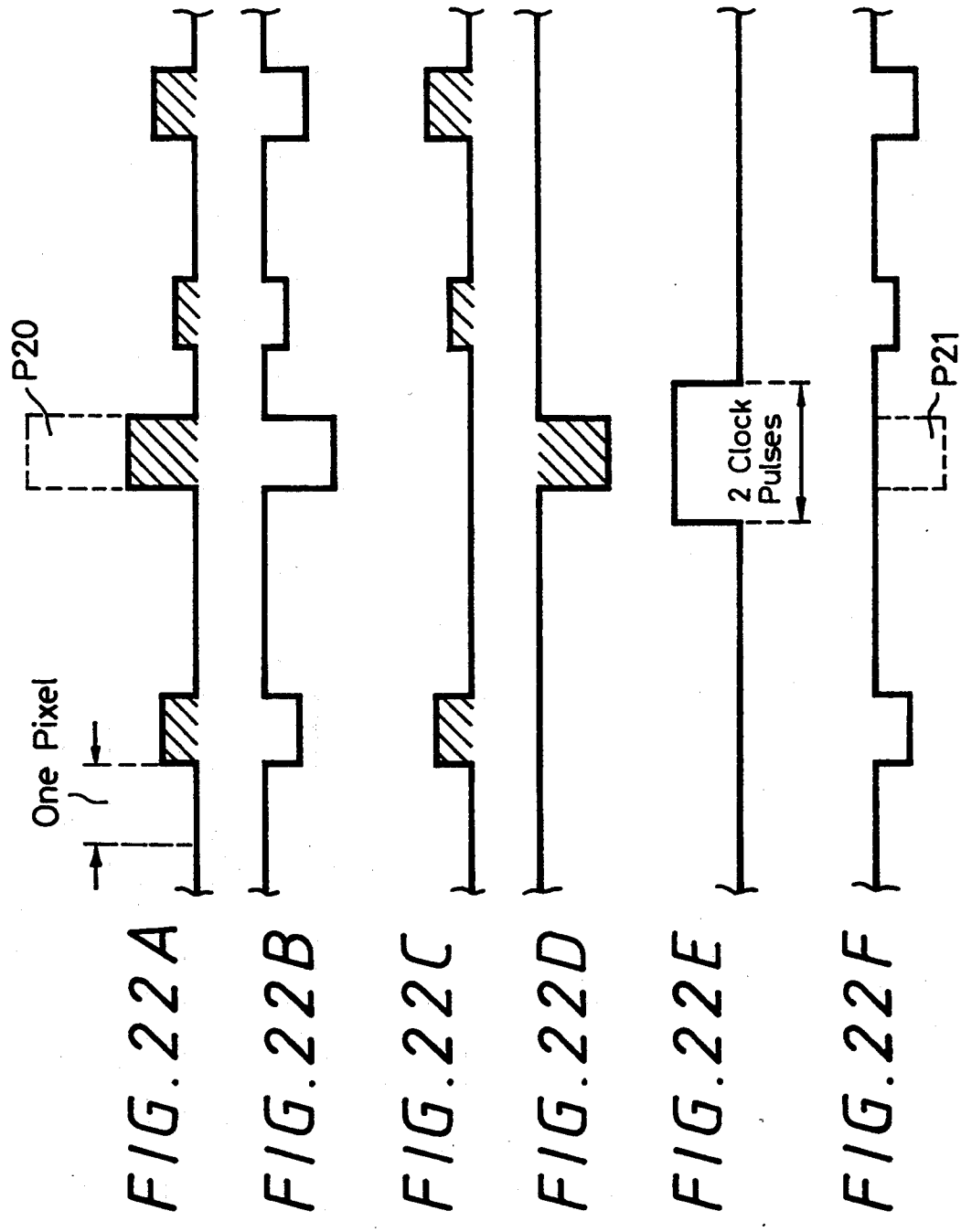

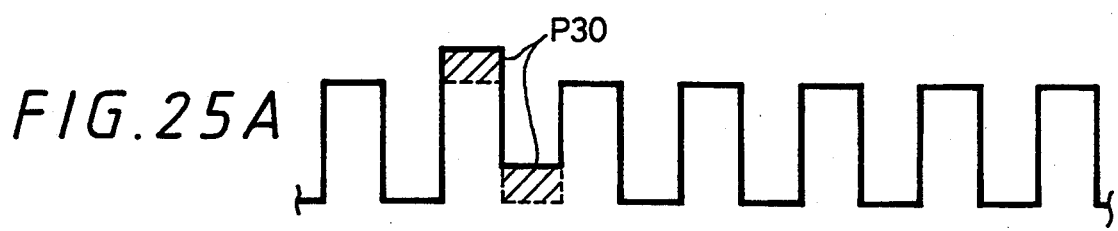
FIG.25A
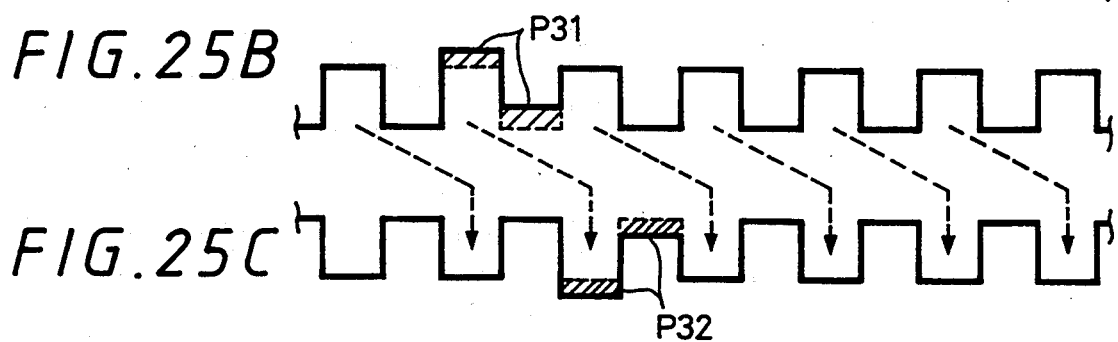
FIG.25B
FIG.25C
FIG.25D
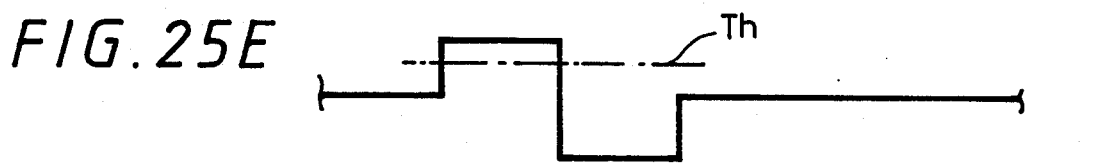
FIG.25E

SOLID-STATE IMAGE PICKUP APPARATUS HAVING A DEFECT DETECTING MODE

BACKGROUND OF THE INVENTION

1. Field of the Invention

The present invention relates to a solid-state image pickup apparatus, and more particularly to a circuit for automatically correcting for a defective pixel of a solid-state image pickup apparatus for use as a video camera, for example, which is capable of switching between a field reading mode and a frame reading mode.

2. Description of the Prior Art

The quality of images produced by a video camera using a solid-state image pickup such as a CCD (Charge-Coupled Device) may be lowered by a defective pixel or pixels that produce a signal of a peculiar level even when no light falls thereon.

Heretofore, such a problem has been solved by a correcting circuit incorporated in a video camera for correcting a signal produced by a defective CCD pixel. More specifically, before manufactured video cameras are shipped to users, each camera is checked for any defective CCD pixels and information indicating the defective CCD pixels is stored in a memory area of the correcting circuit in the video camera. After such a video camera is delivered to a user, signals produced by the defective CCD pixels are corrected by the correcting circuit based on the stored information.

The signal correction is carried out by interpolation processes including zeroth-order interpolation and linear interpolation. According to the zeroth-order interpolation, a signal generated by a defective pixel is held by a sampling circuit, and replaced with a signal produced by a pixel which precedes the defective pixel. According to the linear interpolation, signals produced by respective pixels which precede and follow a defective pixel are averaged, and a signal generated by the defective pixel is replaced with the average signal.

The signal correction method according to the zeroth-order interpolation and linear interpolation will hereinafter referred as a first correction method.

Another signal correction method which does not rely on the interpolation processes controls the video camera to generate a signal corresponding to a signal that is produced by a defective pixel, and deduce the generated signal from the signal produced by the defective signal, thus canceling out the signal produced by the defective signal. This signal correction method will hereinafter referred as a second correction method.

CCD pixels may become defective during the manufacturing process and also may develop a sudden defect after the video camera is actually delivered to the user. Furthermore, CCD pixels may produce an aging-induced signal of a peculiar level when no light is applied thereto.

Such a sudden CCD pixel defect or an aging-induced CCD pixel defect cannot be corrected by checking the camera for any defective CCD pixels and storing information indicative of the defective CCD pixels in a memory area of the correcting circuit in the video camera before the video camera is delivered to a user.

One recent proposal includes a circuit in a video camera for detecting a defective CCD pixel. Any defective CCD pixel is detected by such a circuit, and information indicating the detected defective CCD pixel is stored in a memory in the video camera, so that a signal generated by the defective CCD pixel is corrected based on the stored information.

A defective CCD pixel is detected as follows: While no light is falling on the CCD, the level of a signal generated by each CCD pixel is compared with either the level of a signal generated by a preceding CCD pixel or a predetermined threshold level. If the level of a signal generated by a certain CCD pixel is larger than the level of the signal generated by the preceding CCD pixel or the predetermined threshold level, then that certain CCD pixel is detected as a defective CCD pixel which produces a signal of a peculiar level, and address data with respect to the defective CCD pixel and flaw (defective CCD pixel) data based on the signal level of the defective CCD pixel are produced and stored in the memory.

After the defective CCD pixel is detected, the signal of a peculiar level produced thereby, which is contained in a video signal generated by the CCD, is corrected according to either the first correction method or the second correction method.

It is known that there are two modes for reading a signal from a CCD, i.e., a field reading mode and a frame reading mode. Since many recent video cameras are capable of operating in both field and frame reading modes for reading CCD signals, it is necessary for such video cameras to detect any defective CCD pixels accurately. These two reading modes will briefly be described below with reference to FIGS. 1A, 1B and 2A, 2B of the accompanying drawings.

In the field reading mode, as shown in FIGS. 1A and 1B, electric charges are read from pixels in two vertically adjacent rows into respective transfer regions (vertical transfer registers). The vertical transfer registers add electric charges from the pixels in two vertically adjacent rows, and then transfer the added electric charges to a horizontal transfer register.

More specifically, in an odd-numbered field, as shown in FIG. 1A, electric charges read from photosensitive regions I41, I31 are added by a transfer region, and electric charges read from photosensitive regions I21, I11 are added by a transfer region. Thereafter, the added electric charges are transferred to the horizontal transfer register. In an even-numbered field, as shown in FIG. 1B, electric charge read from the photosensitive region I41 and the region above (not shown) are transferred to and added by a transfer region, electric charges read from the photosensitive regions I31, I21 are transferred to and added by a transfer region, and electric charge read from the photosensitive region I11 and the region below (not shown) are transferred to and added by a transfer region. Thereafter, the transferred and added electric charges are transferred to the horizontal transfer register. In the field reading mode, since the electric charge of each pixel is read in every field, the motion resolution of the video camera is high. However, the vertical resolution is poor as the electric charges from the pixels in vertically adjacent rows are added to each other.

In the frame reading mode, as shown in FIGS. 2A and 2B, an electric charge is read from a pixel in one of two vertically adjacent rows in an odd-numbered field, and an electric charge is read from a pixel in the other row in an even-numbered field.

More specifically, in an odd-numbered field, as shown in FIG. 2A, electric charges read from photosensitive regions I31, I11, I32, I12 are transferred to transfer regions. In an even-numbered field, as shown in FIG. 2B, electric charges read from photosensitive regions I41, I21, I42, I22 are transferred to transfer regions. Thereafter, the transferred electric charges are transferred to a horizontal transfer register. In the frame reading mode, the vertical resolution is high because the electric charges from the pixels in vertically adjacent rows are not added to each other. However, since the electric charge of each pixel is read in every frame, the motion resolution of the video camera is low.

In view of the above shortcomings, the user of the video camera selects one of the field and frame reading modes with a selector switch depending on the conditions in which to use the video camera.

OBJECTS AND SUMMARY OF THE INVENTION

It is an object of the present invention to provide a circuit for automatically correcting accurately for a defective pixel of a solid-state image pickup apparatus for use as a video camera, for example, which is capable of selectively switching between a field reading mode and a frame reading mode.

According to the present invention, there is provided a solid-state image pickup apparatus having a defect detecting mode and an operation mode, comprising a solid-state image sensor having pixels arranged in rows and columns for producing an output signal representing a detected image, drive means for driving the solid-state image sensor in a first reading mode for reading electric charges from the pixels in approximately one field period such that the electric charges of the pixels of two adjacent rows are summed before being outputted from the solid-state image sensor, the summed electric charges being different in even- and odd-numbered fields, and driving the solid-state image sensor in a second reading mode for reading electric charges from the pixels in approximately one frame period such that the electric charges of the pixels of one of two adjacent rows are read in even-numbered fields and the electric charges of the pixels of the other of two adjacent rows are read in odd-numbered fields, detecting means for detecting the positions of defective pixels of the solid-state image sensor in the defect detecting mode, the defective pixels causing noise in the output signal at corresponding times in sampled data of the output signal, memory means for storing the positions of the defective pixels detected by the detecting means, switch means for selecting the defect detecting mode, and control means for controlling the drive means to switch into the second reading mode while in the defect detecting mode.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 6A, 6B, and 6C are diagrams showing the manner in which output video signals from defective CCD pixels are corrected for;

FIGS. 22A through 22F are diagrams showing the manner in which the correcting circuit shown in FIG. 21 operates;

FIGS. 25A through 25E are diagrams showing the manner in which the pre-detection processing circuit operates.

DETAILED DESCRIPTION OF THE PREFERRED EMBODIMENT

Figure 1A:
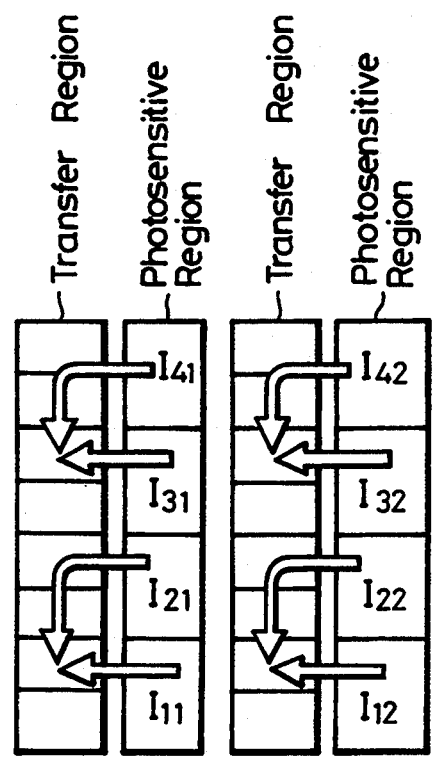
FIGS. 1A and 1B are diagrams showing the principles of a field reading mode.
Figure 1B:
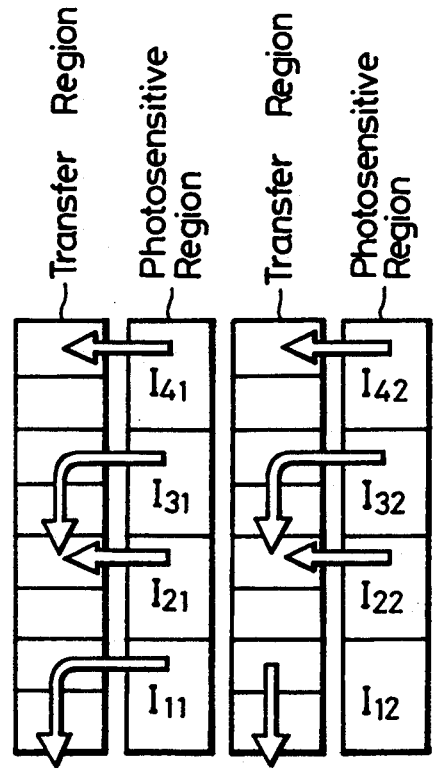
Figure 2A:
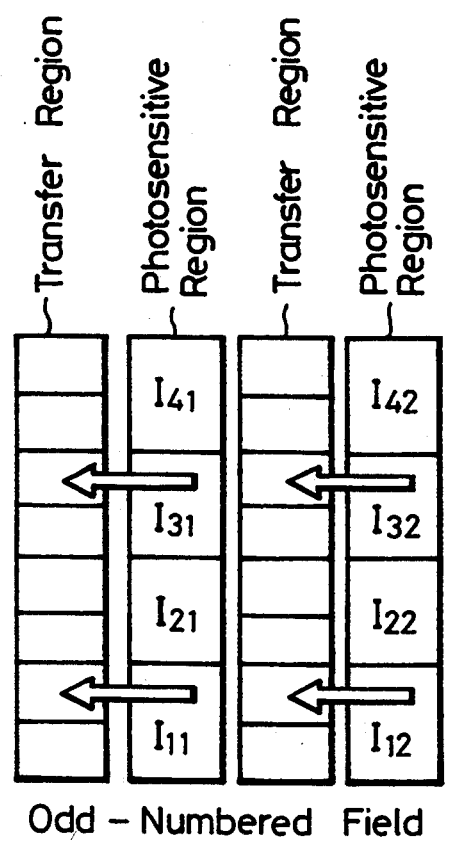
FIGS. 2A and 2B are diagrams showing the principles of a frame reading mode.
Figure 2B:
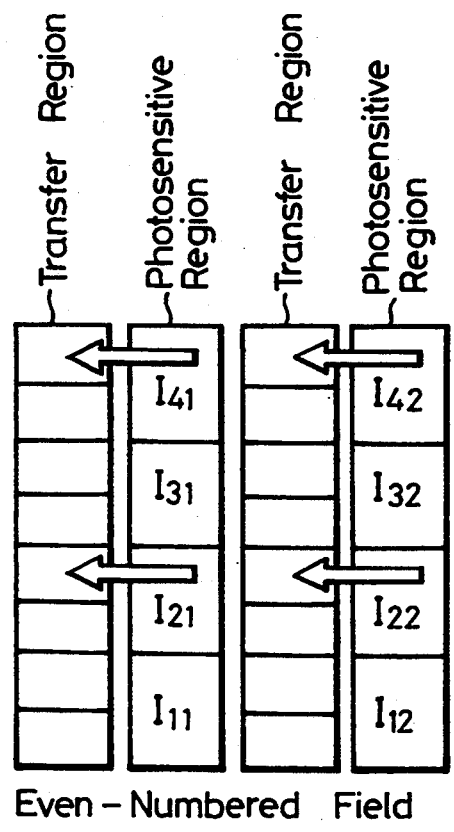
Figure 3:
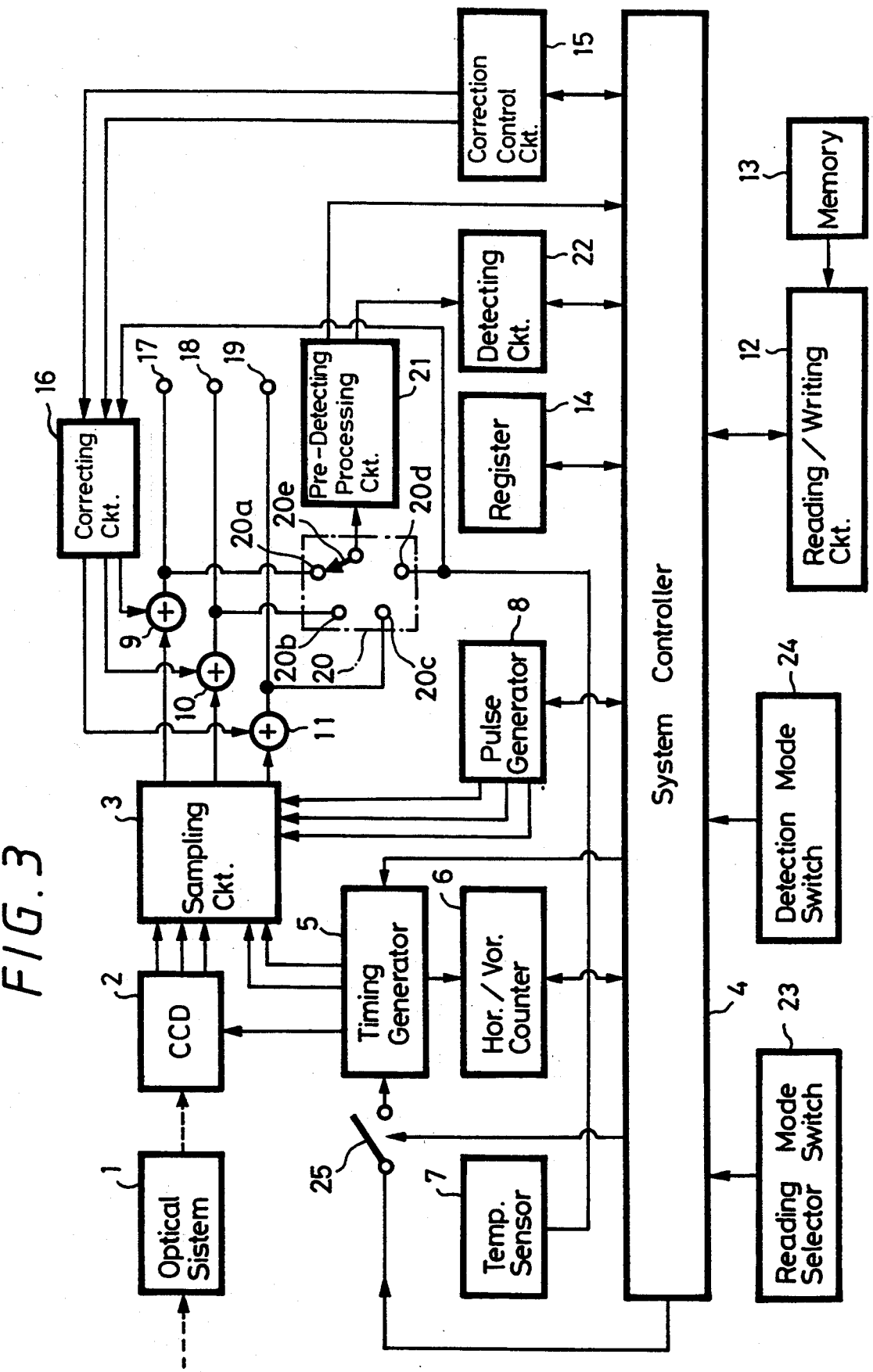
FIG. 3 is a block diagram of a circuit for automatically correcting for a defective pixel of a solid-state image pickup apparatus according to the present invention.

FIG. 3 shows a circuit for automatically correcting for a defective pixel of a solid-state image pickup apparatus according to the present invention, the solid-state image pickup apparatus being embodied as a video camera capable of selectively switching between a field reading mode and a frame reading mode.

As shown in FIG. 3, the video camera has an optical system 1 including a lens, an iris diaphragm, and other optical components for supplying light from a subject being imaged to a CCD (Charge-Coupled Device) 2. In this embodiment, the CCD 2 comprises three CCDs for producing image signals indicative of green, red, and blue image light components. The optical system 1 includes a prism for supplying the green light component to the corresponding CCD, the red light component to the corresponding CCD, and the blue light component to the corresponding CCD. The CCD 2 may comprise a single- or double-panel CCD.

The green, red, and blue light components are photoelectrically converted by the CCD 2, i.e., its respective CCDs. The charge storage time of the CCD 2 is controlled by a charge storage control signal from a timing generator 5, which also produces a read signal to read electric charges from the CCD 2.

The electric charges can be read from the CCD 2 selectively in a field reading mode or a frame reading mode. When a reading mode selector switch 23 is operated on, its signal is applied to a system controller 4, which sends a signal to the timing generator 5 to select one of the field and frame reading modes for the CCD 2.

When a detecting mode switch 24 is operated on, the system controller 4 also selects a defect detecting mode for detecting a defective CCD pixel or an operation mode for generating an image signal while correcting for a CCD pixel defect based on data detected in the defect detecting mode or data detected before the video camera is shipped and stored in a ROM or the like.

In the field reading mode, electric charges stored in vertically adjacent CCD pixels are added to each other in a different combination in every field. Therefore, the electric charge of a defective CCD pixel is outputted in both odd- and even-numbered fields. Since electric charges from vertically adjacent CCD pixels are added to each other, if only the upper CCD pixel is defective, then the CCD pixel defect is detected with poor accuracy because it is detected subsequent to the addition of output signals from the defective CCD pixel and the CCD pixel that is not defective.

The frame reading mode is free of the above problem with the field reading mode as output signals from vertically adjacent CCD pixels are not added to each other.

In this embodiment, when the defect detecting mode is selected, the system controller 4 switches to the frame reading mode. More specifically, when the detecting mode switch 24 is operated on to switch from the operation mode to the detect detecting mode, the system controller 4 determines whether the reading mode is the field reading mode or the frame reading mode.

If the reading mode is the field reading mode, then the system controller 5 sends a control signal to the timing generator 5 to switch the reading mode to the frame reading mode for the CCD 2.

Figures 4, 5:
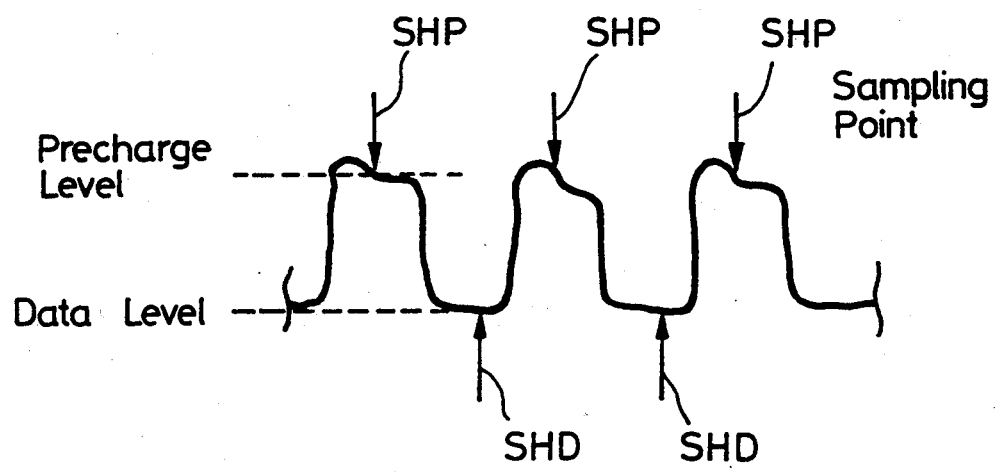
FIG. 4 is a diagram showing the manner in which an output signal from a CCD is sampled by a sampling circuit.
FIG. 5 is a diagram illustrative of defective CCD pixels.

In the frame reading mode, an output signal read from the CCD 2 is supplied to a sampling circuit 3. As shown in FIG. 4, the sampling circuit 3 samples the output signal from the CCD 2 with a precharge level, indicated by SHP, and a data level, indicated by SHD, based on signals from the timing generator 5 and a pulse generator 8 to remove reset noise. Then, the sampling circuit 3 supplies sampled signals, i.e., signals corresponding to the green, red, blue light components, to adders 9, 10, 11.

The adders 9, 10, 11 add correcting signals corresponding to the respective green, red, blue light components to the sampled signals from the sampling circuit 3, and supply sum signals corresponding to the respective green, red, blue light components to another video signal processing circuit in the video camera through respective output terminals 17, 18, 19 and also to respective fixed contacts 20a, 20b, 20c of a switch 20.

In addition to the fixed contacts 20a, 20b, 20c, the switch 20 also has a fixed switch 20d mounted on a package of the CCD 2 for being supplied with temperature information from a temperature sensor 7 which detects the temperature of the CCD 2. The switch 20 also has a movable contact 20e that is selectively connectable to the fixed contacts 20a, 20b, 20c, 20d to supply the signals corresponding to the respective green, red, blue light components and the temperature information to a pre-detection processing circuit 21.

The pre-detection processing circuit 21 removes discrete low levels of the signals corresponding to the respective green, red, blue light components, and then converts these signals and the temperature information into digital signals. Thereafter, the pre-detection processing circuit 21 supplies the digital signals corresponding to the respective green, red, blue light components to a detecting circuit 22 and also supplies the digital temperature data to the system controller 4.

The detecting circuit 22 effects low-pass filtering on the digital signals corresponding to the respective green, red, blue light components, i.e., compares these digital signals with threshold levels for white and black flaws that are displayed white and black, respectively, on the display screen, and supplies the results of comparison to the system controller 4.

The system controller 4 compares the supplied results with a threshold level based on the digital temperature data. If the system controller 4 determines a video signal corresponding to one of the results from the detecting circuit 22 as an output signal from a defective CCD pixel, then the system controller 4 stores various items of information relative to the defective CCD pixel, together with an address signal from a horizontal/vertical counter 6, in a register 14.

After the defect detection is finished, the system controller 4 reads the address data and various information regarding the defective CCD pixel from the register 14, and stores them into a memory 13 such, for example, as an EEPROM and a RAM backed up by a battery, through a writing/reading circuit 12. When the video camera is to be shipped to a user, data relative to defective CCD pixels are stored in the memory 13. Such data storage may be effected by recording defective CCD pixel data detected in the manufacture of the CCD 2 on a recording medium such as a floppy disk, and copying the data stored in the recording medium to the memory 13 by way of LANC communications, for example, using a data writing device, when the video camera is to be shipped to a user. The memory 13 may be divided into two areas, one as a nonvolatile memory and one as a RAM.

In use, the video camera operates to produce image information while correcting for defective CCD pixels detected in the defect detecting mode and defective CCD pixels detected in the manufacturing process. An output signal from a defective CCD pixel detected in the defect detecting mode is corrected according the first correction method referred to above. More specifically, in the operation mode for normal imaging operation, the address signal stored in the memory 13 and indicating the defective CCD pixel is read and compared with an address signal from the horizontal/vertical counter 6. If the compared address signals agree with each other, then the pulse generator 8 and the timing generator 5 are controlled to cause the sampling circuit 3 to hole the signal corresponding to the defective CCD pixel.

An output signal from a defective CCD pixel detected in the manufacturing process is corrected according the second correction method referred to above.

The system controller 4 controls turning-on/off of a switch sw2 for supplying a shutter enable signal with a detection enable signal produced on the basis of set information from a switch sw1, and supplies the detection enable signal to the detecting circuit 22 for controlling the same to detect a defective CCD pixel. For example, when the user of the video camera operates on the switch sw1, the system controller 4 supplies the detection enable signal to the detecting circuit 22 to enter the defect detecting mode. In response to the detection enable signal, the switch sw2 is turned off, not supplying the shutter enable signal to the timing generator 5. Therefore, a shutter operation which makes the charge storage time of the CCD 2 shorter than a normal storage time is not effected, thus reducing the deterioration of a S/N ratio for the detection of a defective CCD pixel to thereby allow a defective CCD pixel to be detected well.

Defective CCD pixels will be described below. As shown in FIG. 5, defective CCD pixels include a white flaw defect W1 that does not depend on light intensity but on temperature, a white flaw defect W2 and a black flaw defect B1 that depend on both light intensity and temperature, and a black flaw defect B2 that does not depend on light intensity but on temperature. In view of the temperature dependency, defective CCD pixels are detected and corrected for also based on the temperature information from the temperature sensor 7.

A certain bias voltage is added to or subtracted from output signals from defective CCD pixels including both white and black flaw defects. Video signals produced by CCD pixels are exactly in response to the intensity of light applied to the CCD pixels. Therefore, a defective component of a video signal produced by a defective CCD pixel can be canceled out by measuring and storing the position of the defective CCD pixel and the amplitude of the defective component at a certain temperature, generating a correcting signal having the same amplitude as and the opposite polarity to the defective component at the same timing as the output video signal produced by the defective CCD pixel, and adding the correcting signal to the output video signal produced by the defective CCD pixel. This process is in accord with the second correction method, and is illustrated in FIGS. 6A through 6C.

Figure 6A:
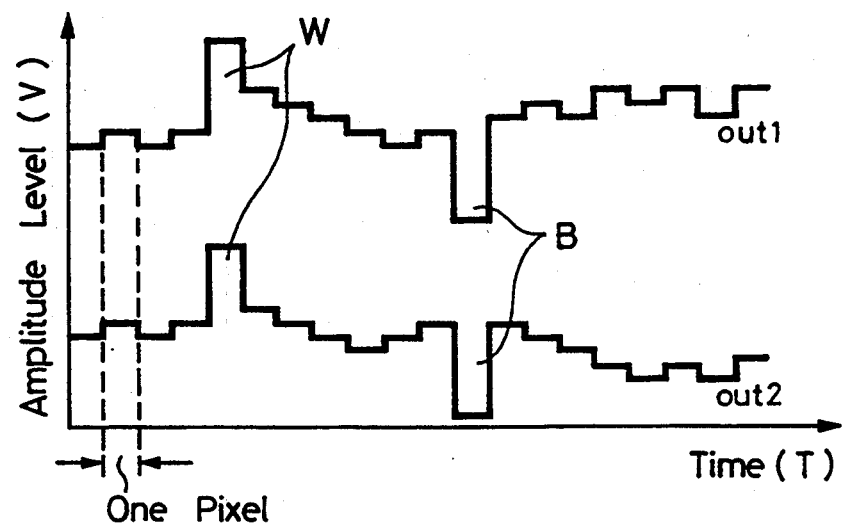
Figure 6B:
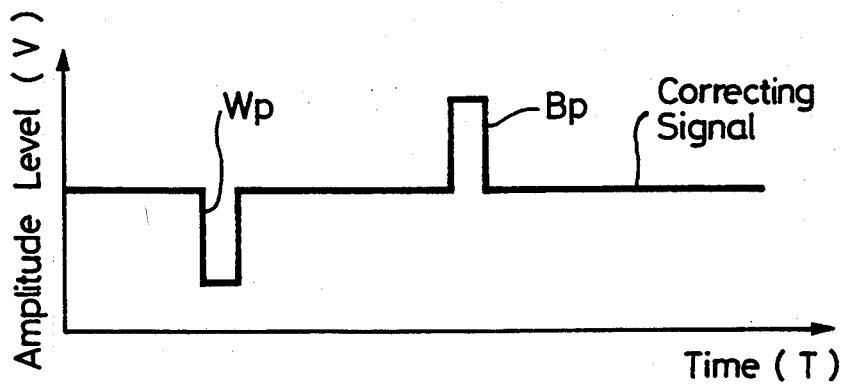
Figure 6C:
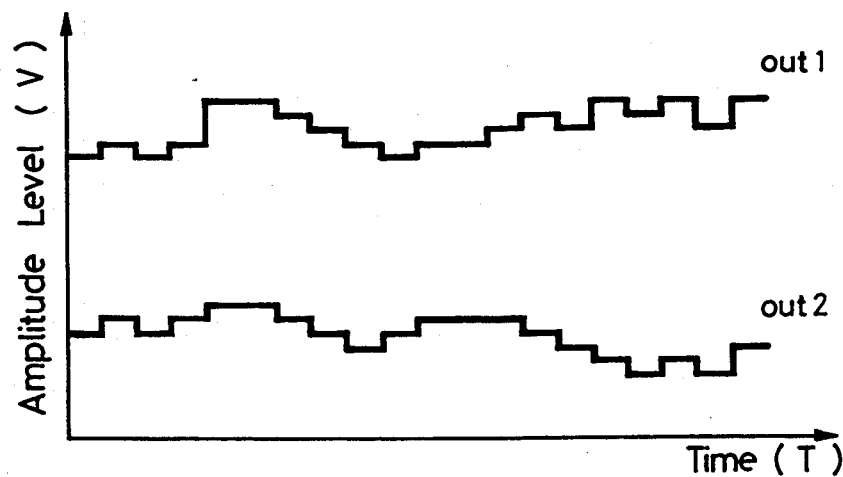

FIGS. 6A through 6C show video signal waveforms in graphs whose vertical axis represents an amplitude level (V) and horizontal axis represents time (T). FIG. 6A shows the waveform of an output video signal out1 when applied light has a large intensity and the waveform of an output video signal out2 when applied light has a small intensity. A time slot indicated by the broken lines corresponds to an output pulse from one pixel.

As shown in FIG. 6A, either one of the output video signals out1, out2 contains a small white flaw defect pulse W generated by a defective CCD pixel and a small black flaw defect pulse B generated by a defective CCD pixel. These small white and black flaw defect pulses W, B of the output video signal out1 shown in FIG. 6A can be corrected for, i.e., canceled out, by adding correcting signals outputted by the correcting circuit 16 shown in FIG. 3 which are composed of small white and black flaw defect pulse correcting signals Wp, Bp shown in FIG. 6B, as indicated by an output video signal out1 in FIG. 6C.

Similarly, the small white and black flaw defect pulses W, B of the output video signal out2 shown in FIG. 6A can be canceled out by adding correcting signals outputted by the correcting circuit 16 shown in FIG. 3 which are composed of small white and black flaw defect pulse correcting signals Wp, Bp shown in FIG. 6B, as indicated by an output video signal out2 in FIG. 6C.

The various circuit components of the circuit shown in FIG. 3 will be described in detail below with reference to FIGS. 7 through 26.

First, the sampling circuit 3 shown in FIG. 3 will be described below with reference to FIGS. 7 through 10.

Figure 7:
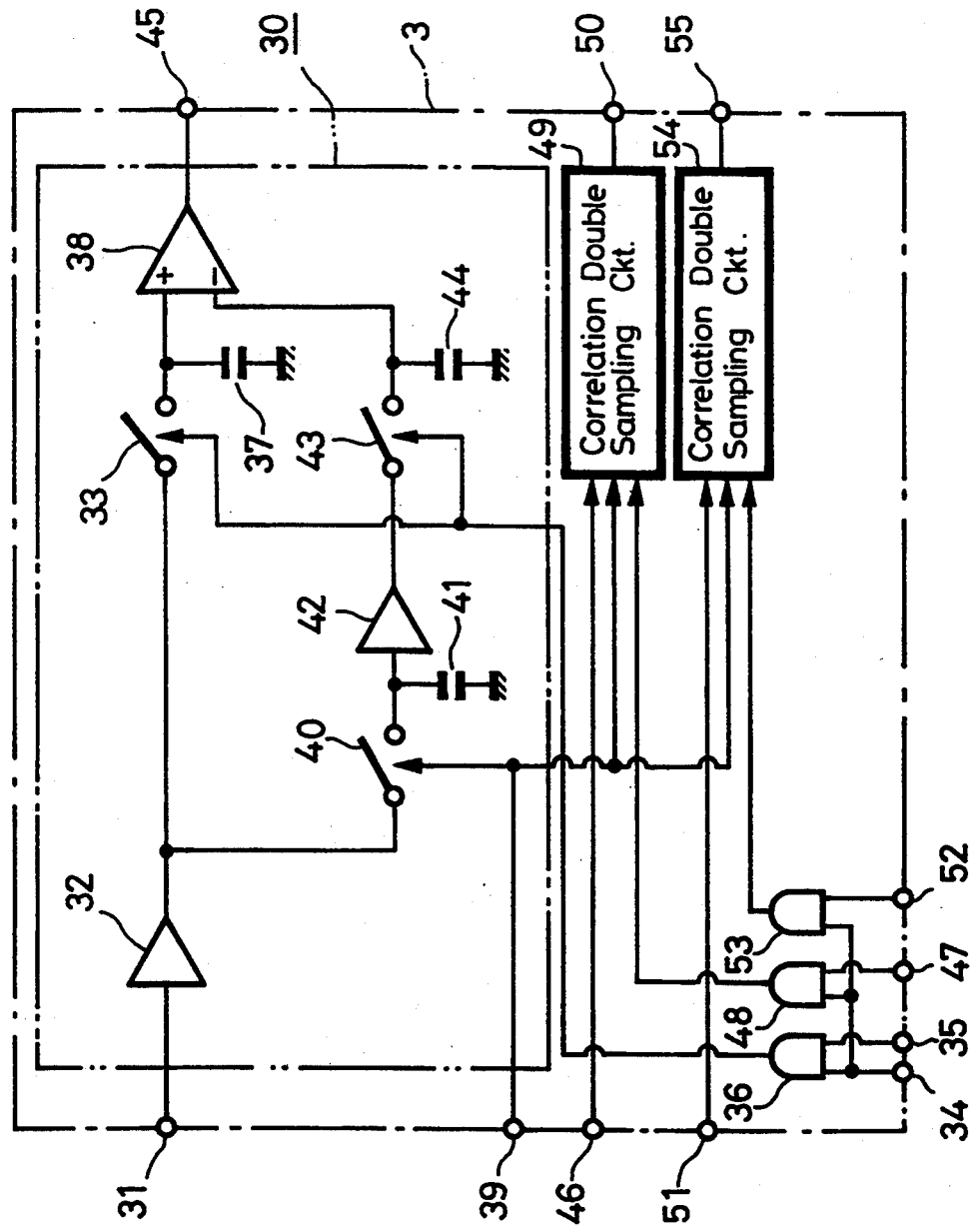
FIG. 7 is a block diagram of the sampling circuit.
Figure 8:
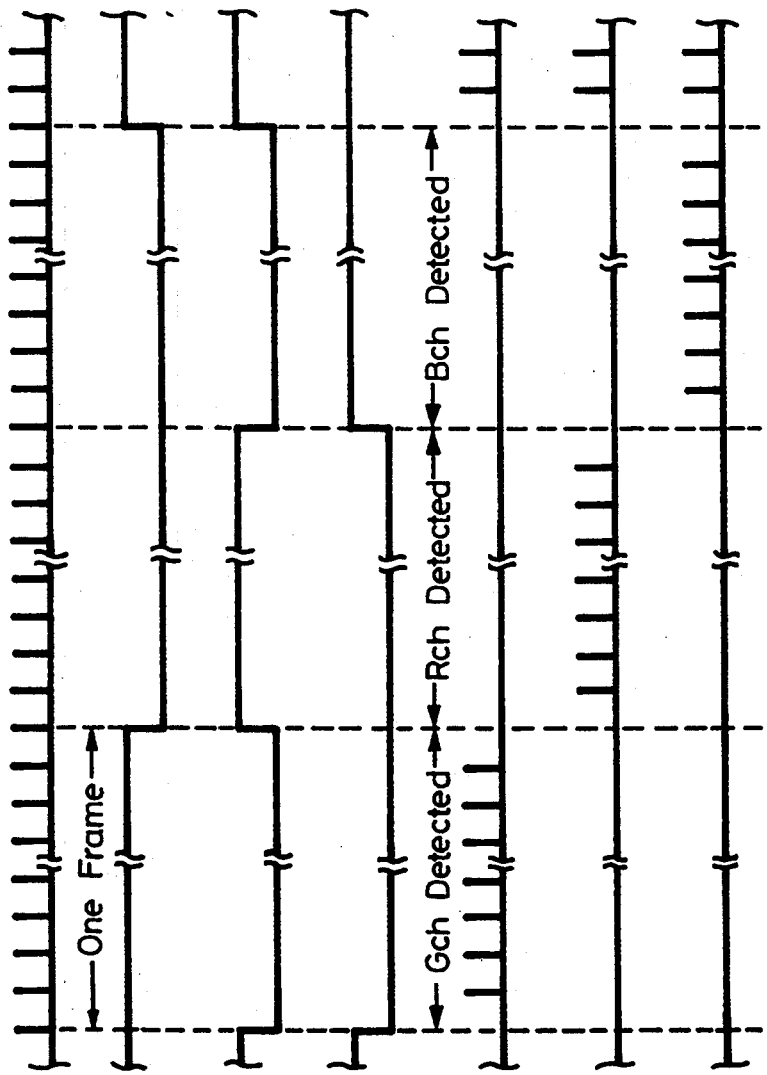
FIGS. 8A through 8G are diagrams showing the waveforms of signals in the sampling circuit.
Figure 9:
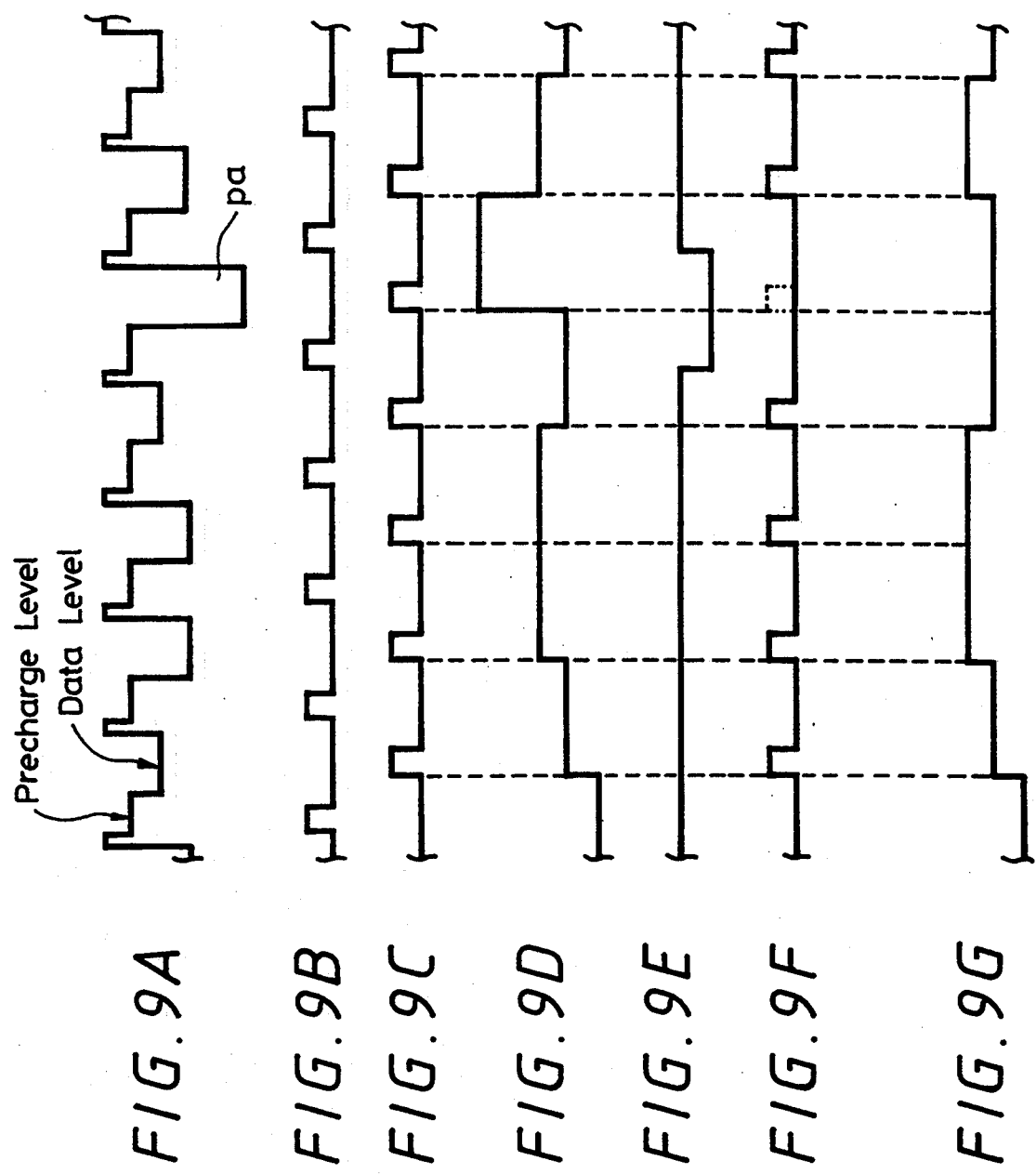
FIGS. 9A through 9G are diagrams showing the manner in which the sampling circuit operates.

As shown in FIG. 7, the sampling circuit 3 includes a correlation double sampling circuit 30 having an input terminal 31 for being supplied with the video signal corresponding to the green light component from the CCD 2 shown in FIG. 3, and an amplifier 32 having an input terminal connected to the input terminal 31 and an output terminal connected through a switch 33 to a noninverting input terminal (+) of an operational amplifier 38, the noninverting input terminal being grounded through a capacitor 37. The operational amplifier 38 has an output terminal connected to an output terminal 45 of the sampling circuit 3. The amplifier 32 has an output terminal connected through a switch 40 to an input terminal of an amplifier 42, which is grounded through a capacitor 41. The output terminal of the operational amplifier 42 is connected through a switch 43 to an inverting input terminal (−) of the operational amplifier 38, which is grounded through a capacitor 44.

The switch 40 is supplied with a sample-and-hold signal SHP from the timing generator 5 through an input terminal 39. The switches 33, 43 are supplied with a sample-and-hold signal SHD from an AND gate 36.

The sample-and-hold signal SHD supplied to the switches 33, 43 is produced by the AND gate 36 which ANDs a signal supplied to an input terminal 34 of the sampling circuit 3 and a frame signal supplied to an input terminal 35 from the timing generator 5 for the signal corresponding to the green light component.

The sampling circuit 3 also includes a correlation double sampling circuit 49 for processing the video signal corresponding to the red light component, the correlation double sampling circuit 49 being identical in structure to the correlation double sampling circuit 30. The correlation double sampling circuit 49 is supplied with the video signal corresponding to the red light component from the CCD 2 shown in FIG. 3 through an input terminal 46, and supplies an output signal to an output terminal 50. Although not shown, the correlation double sampling circuit 49 has a switch, corresponding to the switch 40, for being supplied with the sample-and-hold signal SHP from the timing generator 5 through the input terminal 39, and switches, corresponding to the switches 33, 43, for being supplied with a sample-and-hold signal SHD from an AND gate 48.

The sample-and-hold signal SHD supplied to the switches corresponding to the switches 33, 43 is produced by the AND gate 48 which ANDs the signal supplied to the input terminal 34 of the sampling circuit 3 and a frame signal supplied to an input terminal 47 from the timing generator 5 for the signal corresponding to the red light component.

The sampling circuit 3 further includes a correlation double sampling circuit 54 for processing the video signal corresponding to the blue light component, the correlation double sampling circuit 54 being identical in structure to the correlation double sampling circuit 30. The correlation double sampling circuit 54 is supplied with the video signal corresponding to the blue light component from the CCD 2 shown in FIG. 3 through an input terminal 51, and supplies an output signal to an output terminal 55. Although not shown, the correlation double sampling circuit 54 has a switch, corresponding to the switch 40, for being supplied with the sample-and-hold signal SHP from the timing generator 5 through the input terminal 39, and switches, corresponding to the switches 33, 43, for being supplied with a sample-and-hold signal SHD from an AND gate 53.

The sample-and-hold signal SHD supplied to the switches corresponding to the switches 33, 43 is produced by the AND gate 53 which ANDs the signal supplied to the input terminal 34 of the sampling circuit 3 and a frame signal supplied to an input terminal 52 from the timing generator 5 for the signal corresponding to the blue light component.

The AND gates 36, 48, 53 are supplied with a signal shown in FIG. 8A. The AND gate 36 is also supplied with a frame signal from the timing generator 5, which becomes active in one of three frames for the Gch (green-channel) signal corresponding to the green light component as shown in FIG. 8B. The AND gate 36 ANDs these supplied signals to generate a sample-and-hold signal SHD as shown in FIG. 8E.

Likewise, the AND gate 48 is also supplied with a frame signal from the timing generator 5, which becomes active in one of three frames for the Rch (red-channel) signal corresponding to the red light component as shown in FIG. 8C. The AND gate 48 ANDs these supplied signals to generate a sample-and-hold signal SHD as shown in FIG. 8F.

Likewise, the AND gate 53 is also supplied with a frame signal from the timing generator 5, which becomes active in one of three frames for the Bch (blue-channel) signal corresponding to the blue light component as shown in FIG. 8D. The AND gate 53 ANDs these supplied signals to generate a sample-and-hold signal SHD as shown in FIG. 8G.

Operation of the sampling circuit 3 will be described below with reference to FIGS. 9A through 9G.

As shown in FIG. 9A, the precharge level of the signals (Gch, Rch, Bch) supplied from the CCD 2 to the sampling circuit 3 shown in FIG. 7 is sampled and held by the sample-and-hold signal SHP shown in FIG. 9B which is supplied from the timing generator 5 to the input terminal 39 shown in FIG. 7, and the data level of the signal shown in FIG. 9A is sampled and held by the sample-and-hold signals SHD shown in FIG. 9C which are supplied as output signals from the AND gates 36, 48, 53 and shown in FIGS. 8E, 8F, 8G, respectively.

If the data level has an abnormal level pa as shown in FIG. 9A, then the abnormal level pa would also be outputted as shown in FIG. 9D. To avoid this, using a signal indicating the position of the abnormal level pa, the signal corresponding to the abnormal level pa among the sampling signals SHD shown in FIG. 9C is not outputted as shown in FIG. 9F. Then, as shown in FIG. 9G, the output signal from the preceding pixel is held over the signal corresponding to the abnormal level pa. Therefore, the output terminals 45, 50, 55 connected to the operational amplifiers 38 of the correlation double sampling circuits 30, 49, 54 produce output signals free of the abnormal level pa as shown in FIG. 9G.

As shown in FIG. 7, the noninverting input terminal (+) of the operational amplifier 38 in each of the correlation double sampling circuits 30, 49, 54 is supplied with a signal representative of the data level sampled at each pixel, and the inverting input terminal (−) of the operational amplifier 38 is supplied with a signal representative of the data level sampled at each pixel. Therefore, data and reset potentials of each pixel are sampled and held, and the difference therebetween is produced by the operational amplifier 38 and outputted therefrom.

Therefore, reset noise or the like which is an in-phase component between the reset and data potentials can be removed.

As shown in FIG. 7, when the signals corresponding to the green, red, blue light components from the CCD 2, i.e., the Gch, Rch, Bch output signals are sampled, the sampling of the Rch and Bch output signals is stopped while the Gch output signal is being sampled, the sampling of the Gch and Bch output signals is stopped while the Rch output signal is being sampled, and the sampling of the Gch and Rch output signals is stopped while the Bch output signal is being sampled. Consequently, it is possible to prevent the accuracy of defective pixel detection from being lowered due to inclusion of data from other channels than the channel that is being sampled.

Figure 10:
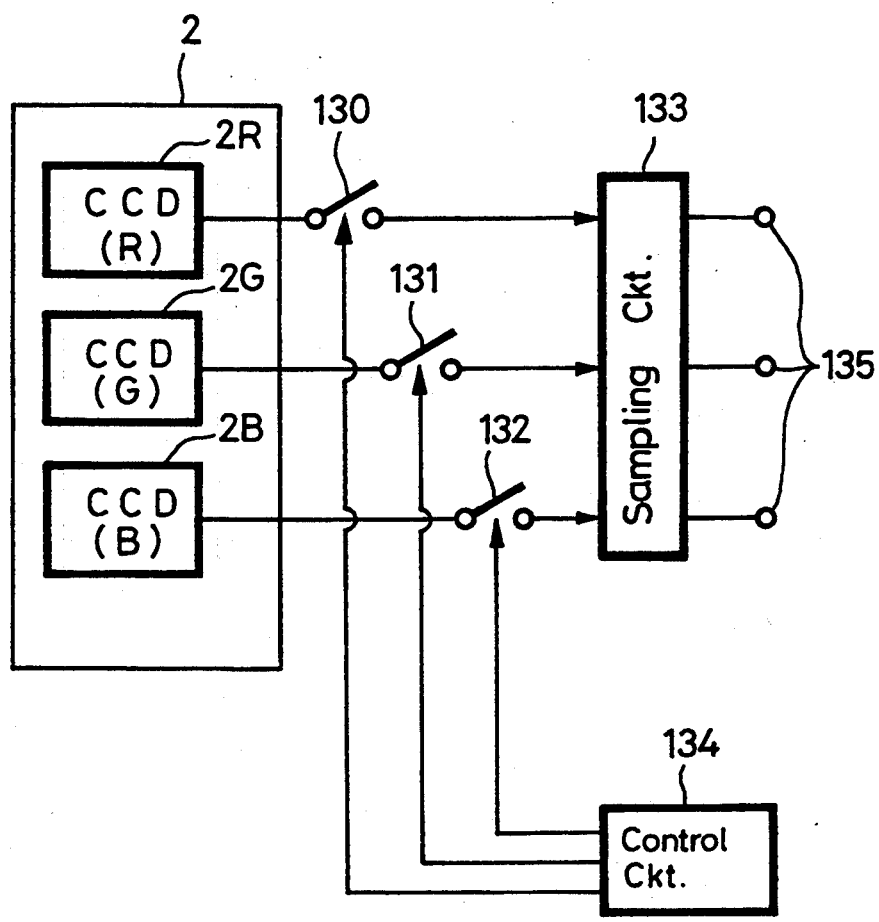
FIG. 10 is a block diagram of a circuit for preventing inclusion of data from other channels than a channel being sampled.

FIG. 10 shows another circuit for preventing inclusion of data from other channels than a channel which is being sampled. As shown in FIG. 10, output video signals from a CCD (R) 2R, a CCD (G) 2G, and a CCD (B) 2B are supplied to a sampling circuit 133 through respective switches 130, 131, 132, and the sampling circuit 133 produces output signals from respective output terminals 135. The switches 130, 131, 132 are successively turned on in one frame period by control signals from a control circuit 134.

It is assumed that the control circuit 134 outputs control signals as shown in FIGS. 8B, 8C, and 8D. Then, the switch 131 is supplied with a frame signal that becomes active in one of three frame periods as shown in FIG. 8B, and turned on while the supplied frame signal is active, whereupon the output video signal from the CCD 2G is supplied through the switch 131 to the sampling circuit 133 and sampled thereby. The switch 130 is supplied with a frame signal that becomes active in one of three frame periods as shown in FIG. 8C, and turned on while the supplied frame signal is active, whereupon the output video signal from the CCD 2R is supplied through the switch 130 to the sampling circuit 133 and sampled thereby. The switch 132 is supplied with a frame signal that becomes active in one of three frame periods as shown in FIG. 8D, and turned on while the supplied frame signal is active, whereupon the output video signal from the CCD 2B is supplied through the switch 132 to the sampling circuit 133 and sampled thereby.

As with the sampling circuit 3 shown in FIG. 7, therefore, when the signals corresponding to the green, red, blue light components from the CCD 2, i.e., the Gch, Rch, Bch output signals are sampled, the Rch and Bch output signals are not supplied to the sampling circuit 133 and hence not sampled while the Gch output signal is being sampled, the Gch and Bch output signals are not supplied to the sampling circuit 133 and hence not sampled while the Rch output signal is being sampled, and the Gch and Rch output signals are not supplied to the sampling circuit 133 and hence not sampled while the Bch output signal is being sampled. Consequently, the accuracy of defective pixel detection is prevented from being lowered due to inclusion of data from other channels than the channel that is being sampled.

The system controller 4 shown in FIG. 3 will be described in detail below with reference to FIG. 11.

Figure 11:
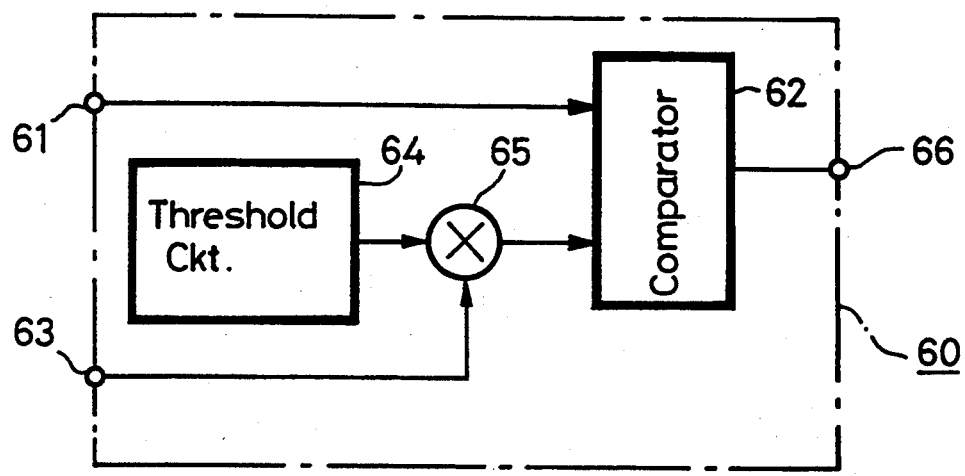
FIG. 11 is a block diagram of a comparing circuit in a system controller.

As shown in FIG. 11, the system controller 4 has a comparing circuit 60 in addition to other circuits thereof (not shown). The comparing circuit 60 has a comparator 62 which is supplied with the output signal, indicating the results of comparison, from the detecting circuit 22 shown in FIG. 3 through an input terminal 61, a multiplier 65 which is supplied with the digital temperature data from the pre-detection processing circuit 21 shown in FIG. 3 through an input terminal 63, and a threshold circuit 64 which supplies threshold data to the multiplier 65. The multiplier 65 modulates the threshold data from the threshold circuit 64 with the digital temperature data that has been detected by the temperature sensor 7 (see FIG. 3) thermally coupled to the CCD 2 and digitally converted by the pre-detection processing circuit 21. The modulated threshold data and the output signal from the detecting circuit 22 are supplied to the comparator 62 and compared thereby. The result of comparison is supplied from the comparator 62 through an output terminal 66 to the non-illustrated other circuits of the system controller 4.

With the circuit arrangement shown in FIG. 11, the threshold data for determining that an output signal from a defective CCD pixel having positive temperature characteristics is an output signal from a defective CCD pixel can have positive temperature characteristics, thereby providing a constant detecting performance for detecting signals outputted from defective CCD pixels. Therefore, the dependency on the temperature of the detecting capability of an automatic defective pixel detecting system is greatly reduced. The automatic defective pixel detecting system is thus capable of well detecting defective CCD pixels while preventing erroneous detection of output signals from minor defective CCD pixels which are not required to be detected in actual applications.

The register 14 shown in FIG. 3 will be described in detail below with reference to FIG. 12.

Figure 12:
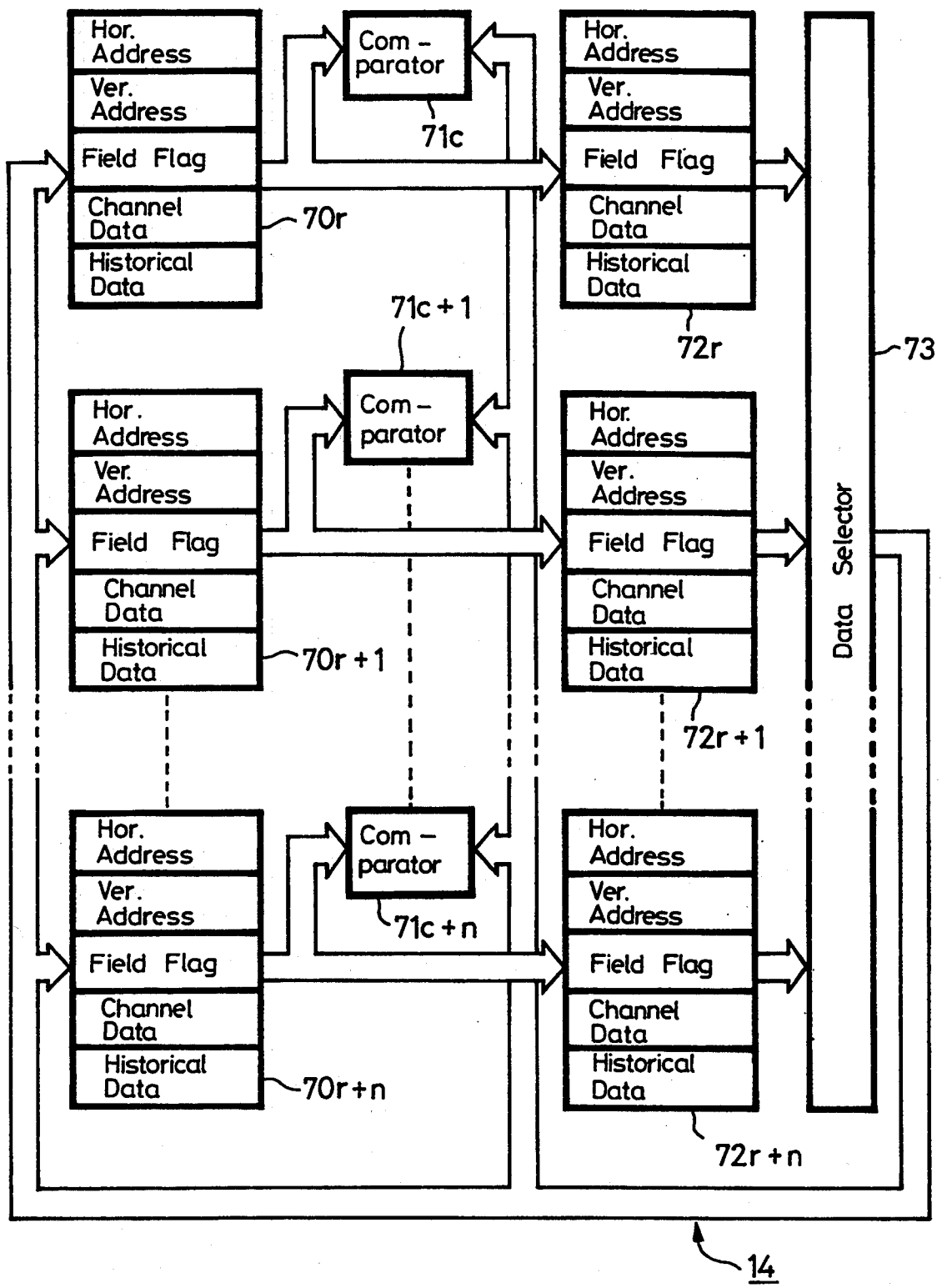
FIGS. 12 through 20 are block diagram of a register in the circuit shown in FIG. 3.

As shown in FIG. 12, the register 14 has main registers 70r, 70r+1, ..., 70r+n each comprising an area for storing a horizontal address, an area for storing a vertical address, an area for storing a field flag indicative of the field of a video signal, an area for storing channel information (Rch, Gch, or Bch information), and an area for storing historical data. Information stored in these areas is information about defective CCD pixels.

The historical data represents the number of times that a certain pixel is not detected as a defect. In this embodiment, when a certain pixel is not detected as a defect ten times, this pixel is not regarded as a defect. This is because a certain pixel may output or may not output a signal of a peculiar level, i.e., an output level as a defect, in every field or every frame or irregularly.

More specifically, when a pixel which irregularly outputs a signal of a peculiar level produces an output signal of a normal level, the pixel would be detected as a normal pixel. If a defective pixel were detected only once, then when a pixel which outputs a signal of a normal level is detected as a defective pixel due to noise or the like, the data indicating the detective pixel would remain for a long time.

According to this invention, a pixel which irregularly outputs a signal of a peculiar level is detected as a defective pixel, and the signal produced thereby is corrected for. In this manner, noise that happens to be mixed in a video signal will not be detected as a defective pixel signal.

The information stored in the 70r, 70r+1, ..., 70r+n constitutes information about pixels detected prior to the start of a present defect detecting process, i.e., information about pixels already detected as defects at present.

The register 14 also has auxiliary registers 72r, 72r+1, ..., 72r+n each comprising an area for storing a horizontal address, an area for storing a vertical address, an area for storing a field flag indicative of the field of a video signal, an area for storing channel information (Rch, Gch, or Bch information), and an area for storing historical data. Information stored in these areas is information about defective CCD pixels. Specifically, before a defect detecting process is started, the information stored in the main registers 70r, 70r+1, ..., 70r+n with respect to pixels that have been detected as defects at present is transferred to the auxiliary registers 72r, 72r+1, ..., 72r+n, respectively.

The register 14 further includes comparators 71c, 71c+1, ..., 71c+n for detecting whether the defective pixel information read from the auxiliary registers 72r, 72r+1, ..., 72r+n by a data selector 73 agrees with the position information from the main registers 70r, 70r+1, ..., 70r+n, and transferring the result of detection to the system controller 4.

Operation of the register 14 shown in FIG. 12 will be described below with reference to FIGS. 13 through 20.

Figure 13:
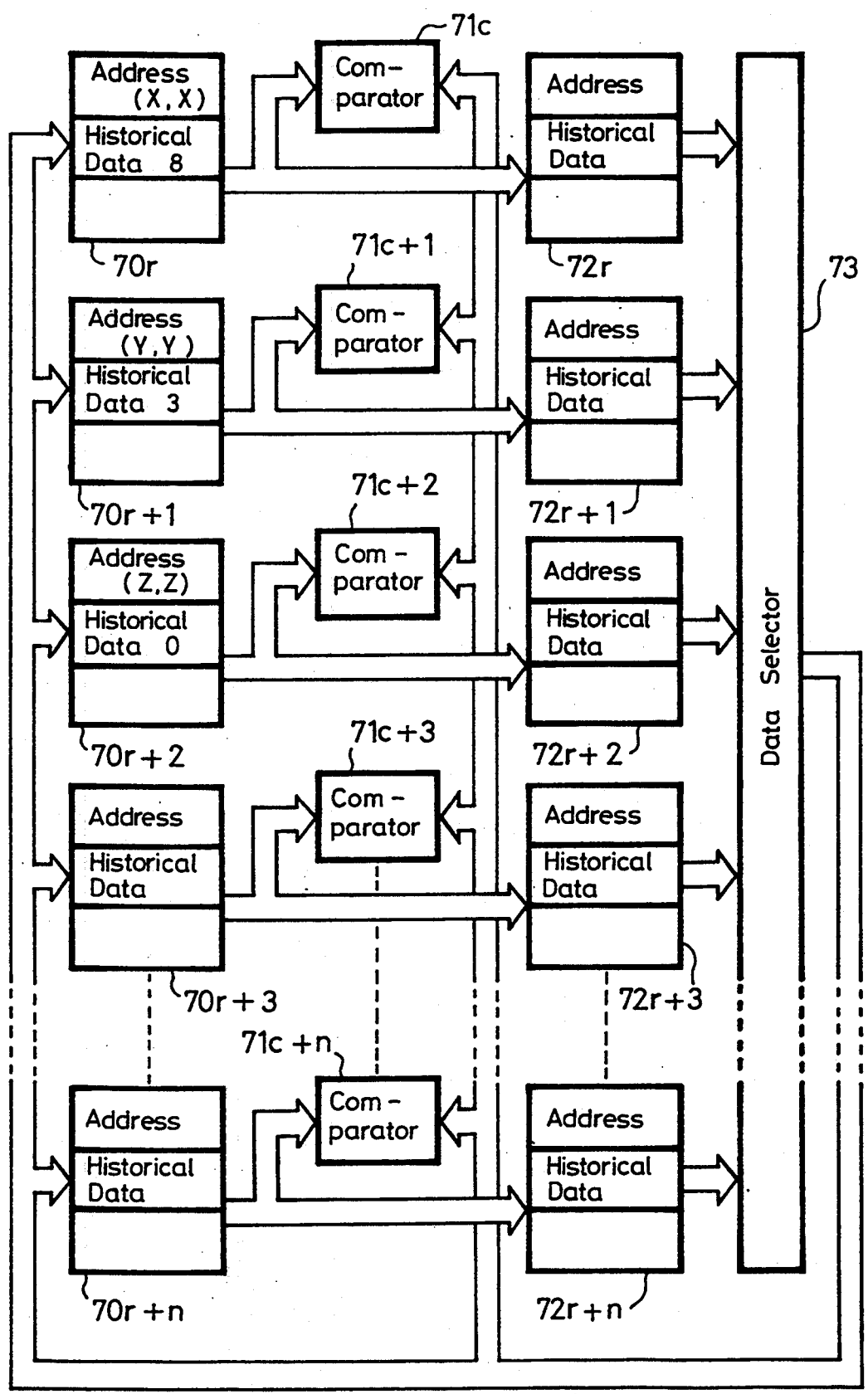

In FIG. 13, information of pixels detected as defects at present is stored in the main registers 70r, 70r+1, 70r+2, ..., 70r+n. The address area of the main register 70r stores address data of a defective pixel having an address (x, x), and the historical data area thereof stores historical data "8". The address area of the main register 70r+1 stores address data of a defective pixel having an address (y, y), and the historical data area thereof stores historical data "3". The address area of the main register 70r+2 stores address data of a defective pixel having an address (z, z), and the historical data area thereof stores historical data "0".

For the sake of brevity, the other information shown in FIG. 12 will not be described below.

Figure 14:
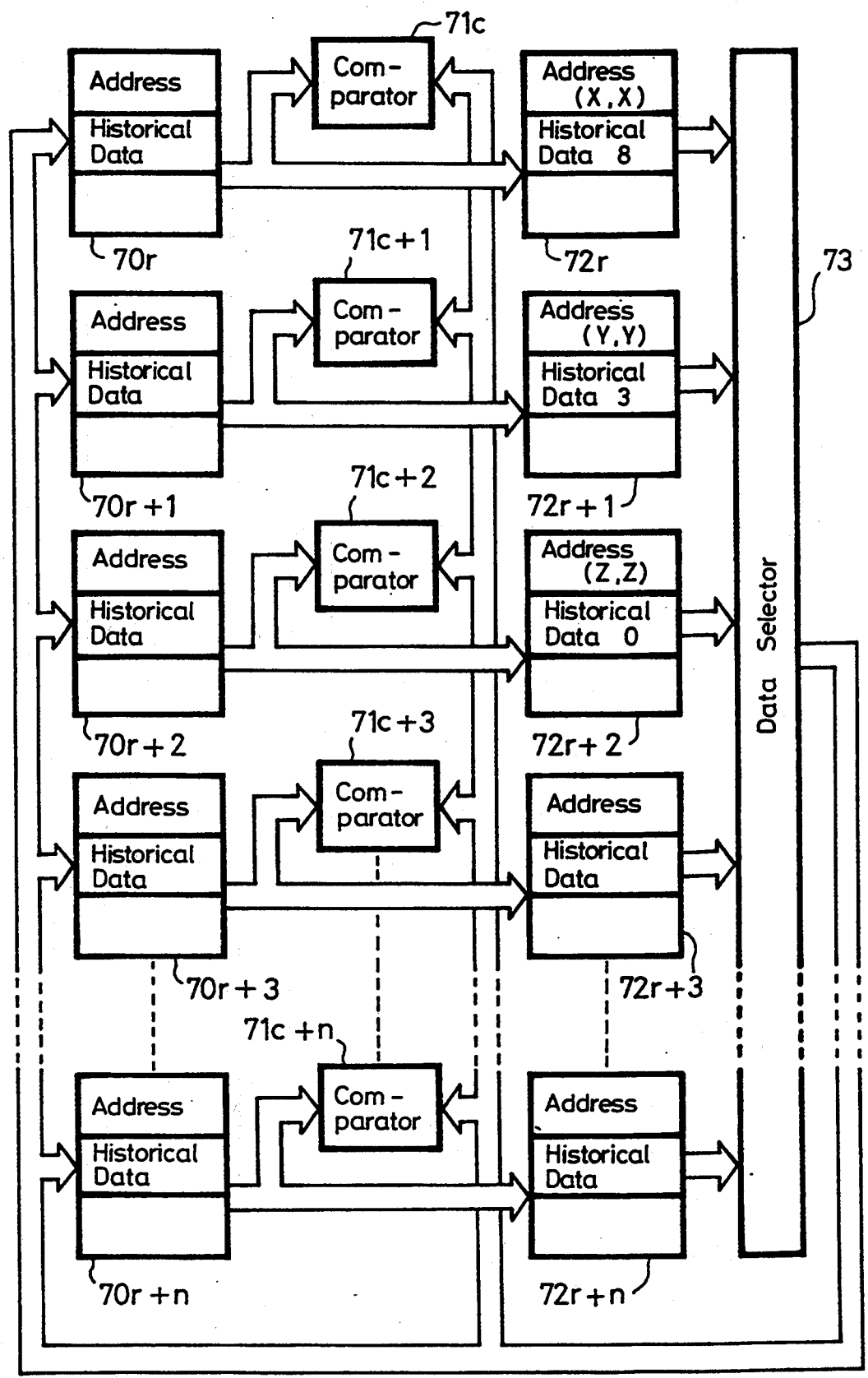

Prior to detection of defective pixels, the contents of the main registers 70r, 70r+1, 70r+2, 70r+3, ..., 70r+n are transferred to the auxiliary registers 72r, 72r+1, 72r+2, 72r+3, ..., 72r+n, as shown in FIG. 14, by a control signal from the system controller 4. Thereafter, all the contents of the main registers 70r, 70r+1, 70r+2, 70r+3, ..., 70r+n are cleared.

Figure 15:
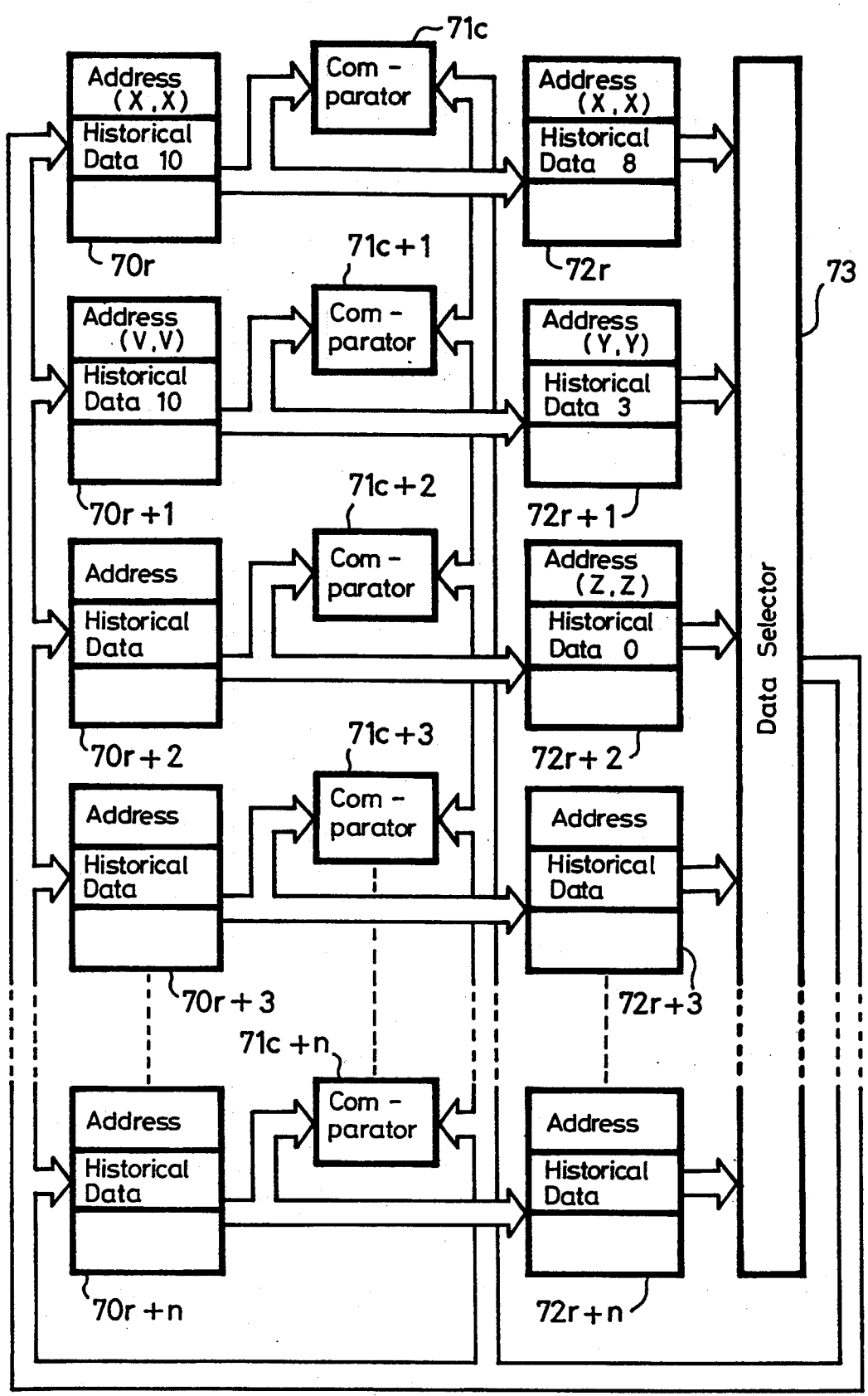

In FIGS. 13 through 20, blank address areas indicate that any pixel information is cleared and hence not stored therein. After the contents of the main registers 70r, 70r+1, 70r+2, 70r+3, ..., 70r+n are cleared, defective pixels are detected under the control of the system controller 4, and information of pixels detected as defects is stored in the main registers 70r, 70r+1, 70r+2, 70r+3, ..., 70r+n, as shown in FIG. 15. In FIG. 15, The address area of the main register 70r stores address data of the defective pixel having the address (x, x), and the historical data area thereof stores historical data "10". The address area of the main register 70r+1 stores address data of a defective pixel having an address (v, v), and the historical data area thereof stores historical data "10". Although not shown, other information than the address data and historical data of these defective pixels is also stored.

Figure 16:
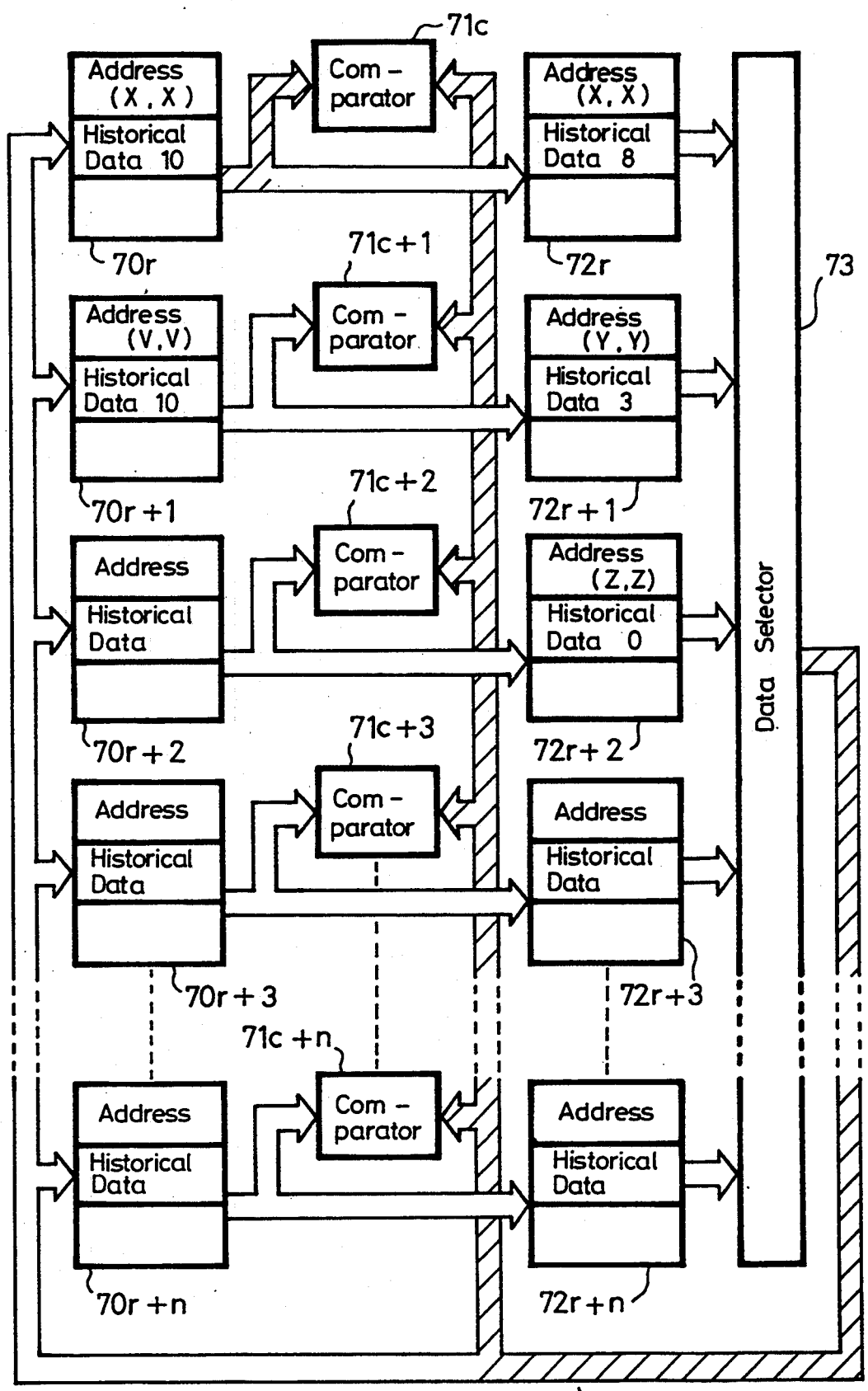

As indicated by a hatched signal line in FIG. 16, the content of the auxiliary register 72r is read by the data selector 73, and the read defective pixel information is supplied to the comparators 71c, 71c+1, 71c+2, 71c+3, ..., 71c+n, which compare the supplied defective pixel information with the defective pixel information from the main registers 70r, 70r+1, 70r+2, 70r+3, ..., 70r+n.

The comparators 71c, 71c+1, 71c+2, 71c+3, ..., 71c+n determine whether the defective pixel addresses read from the auxiliary registers 72r, 72r+1, 72r+2, 72r+3, ..., 72r+n are the same as the defective pixel addresses from the main registers 70r, 70r+1, 70r+2, 70r+3, ..., 70r+n or not. At this time, it is also necessary to check whether both horizontal and vertical addresses from the auxiliary registers 72r, 72r+1, 72r+2, 72r+3, ..., 72r+n are the same as those the main registers 70r, 70r+1, 70r+2, 70r+3, ..., 70r+n or not, and also whether the channel data from the auxiliary registers 72r, 72r+1, 72r+2, 72r+3, ..., 72r+n are the same as those the main registers 70r, 70r+1, 70r+2, 70r+3, ..., 70r+n or not.

In the example shown in FIG. 16, the address data of the defective pixel information stored in the auxiliary register 72r is the same as the address data of the defective pixel information stored in the main register 70r, and the channel data of the defective pixel information stored in the auxiliary register 72r is also the same as the channel data of the defective pixel information stored in the main register 70r. The comparator 71c then supplies a signal indicating the detected result to the system controller 4, for example.

Figure 17:
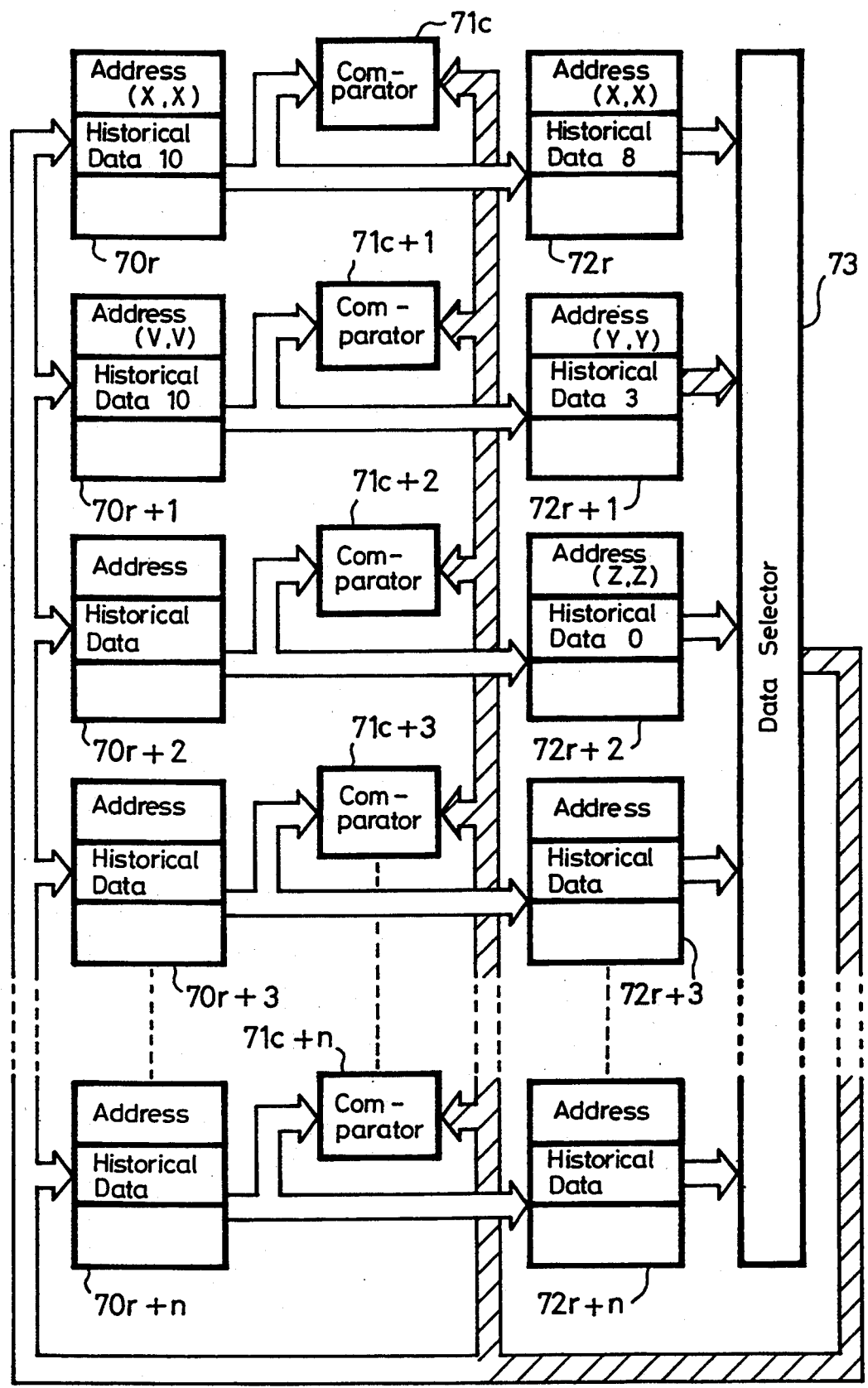
Figure 18:
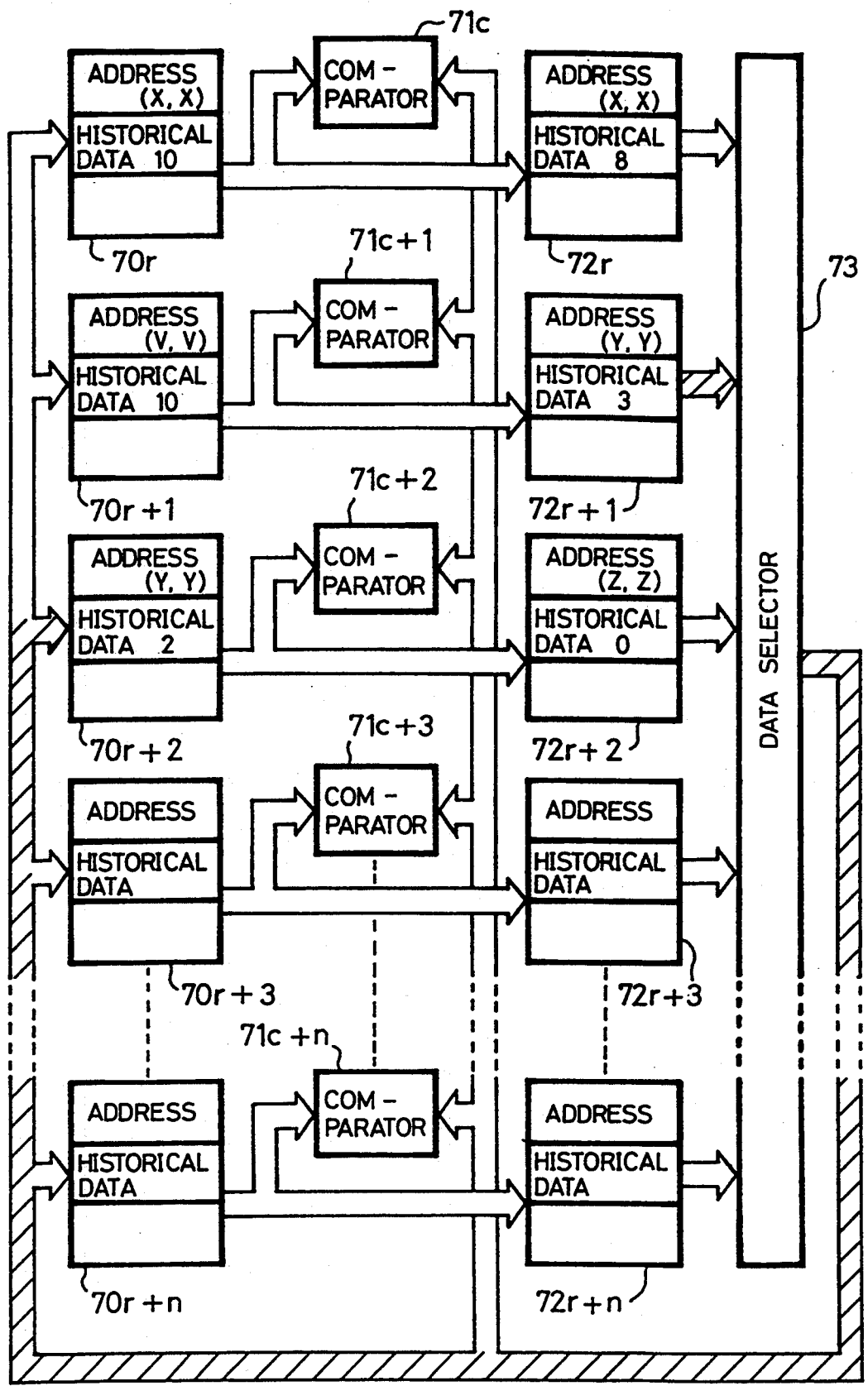

Then, as indicated by a hatched signal line in FIG. 17, the content of the auxiliary register 72r+1 is read by the data selector 73, and the read defective pixel information is supplied to the comparators 71c, 71c+1, 71c+2, 71c+3, ..., 71c+n, which compare the supplied defective pixel information with the defective pixel information from the main registers 70r, 70r+1, 70r+2, 70r+3, ..., 70r+n.

In the example shown in FIG. 17, the address data of the defective pixel information stored in the auxiliary register 72r+1 is not the same as the address data of the defective pixel information stored in any of the main register 70r, 70r+1, 70r+2, 70r+3, ..., 70r+n. Therefore, any of the comparators 71c, 71c+1, 71c+2, 71c+3, ..., 71c+n do not respond, i.e., do not supply a signal to the system controller 4. At this time, the historical data "3" is stored in the historical data area of the auxiliary register 72r+1. Now, "1" is deducted from the historical data "3" is stored in the historical data area of the auxiliary register 72r+1, and the defective pixel information stored in this auxiliary register 72r+1 with the historical data changed to "2" is stored in any one of the unused main registers 70r+2, 70r+3, ..., 70r+n. In this example, the defective pixel information from the auxiliary register 72r+1 is stored in the main register 70r+2 as indicated by a hatched signal line in FIG. 18.

Figure 19:
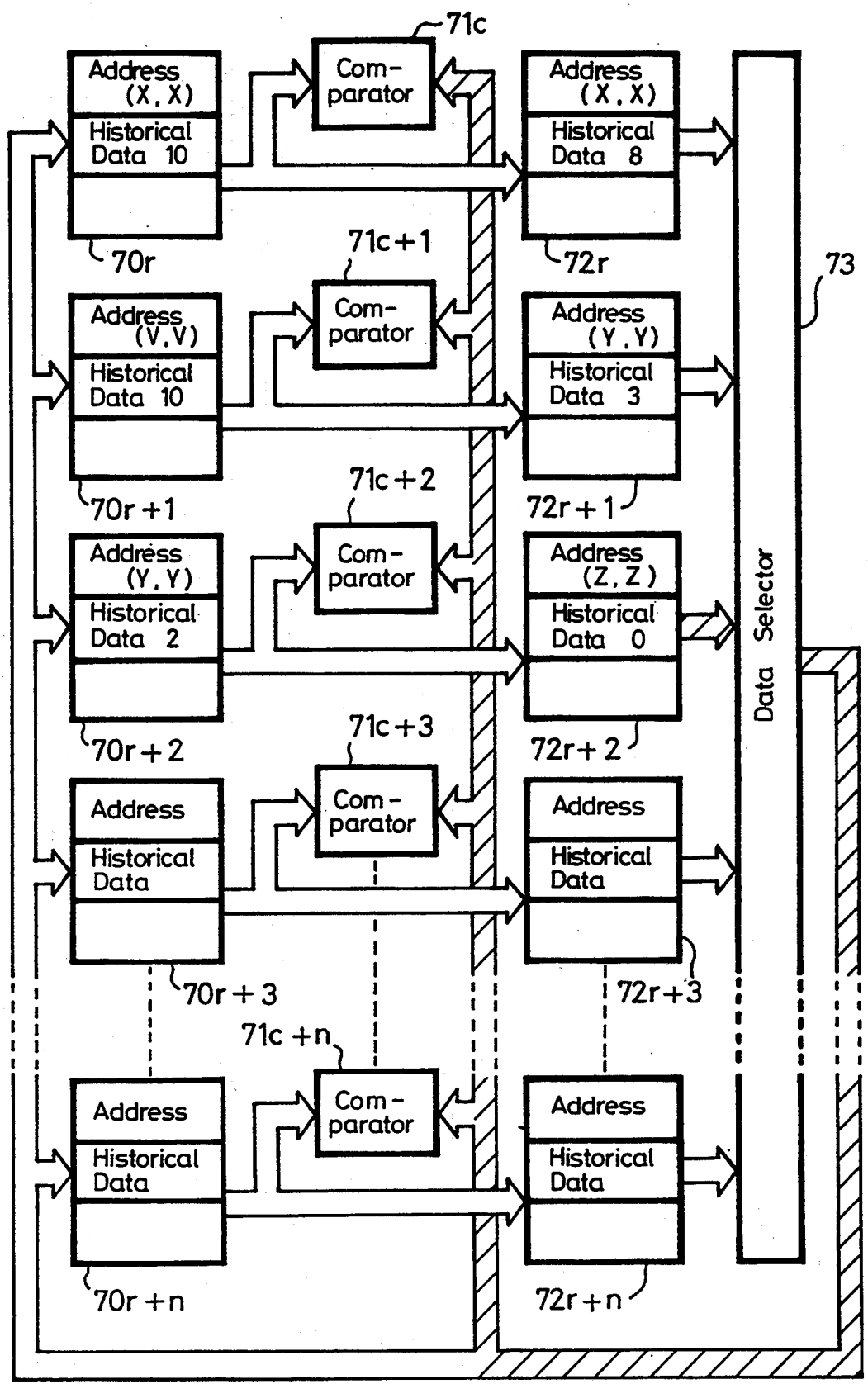
Figure 20:
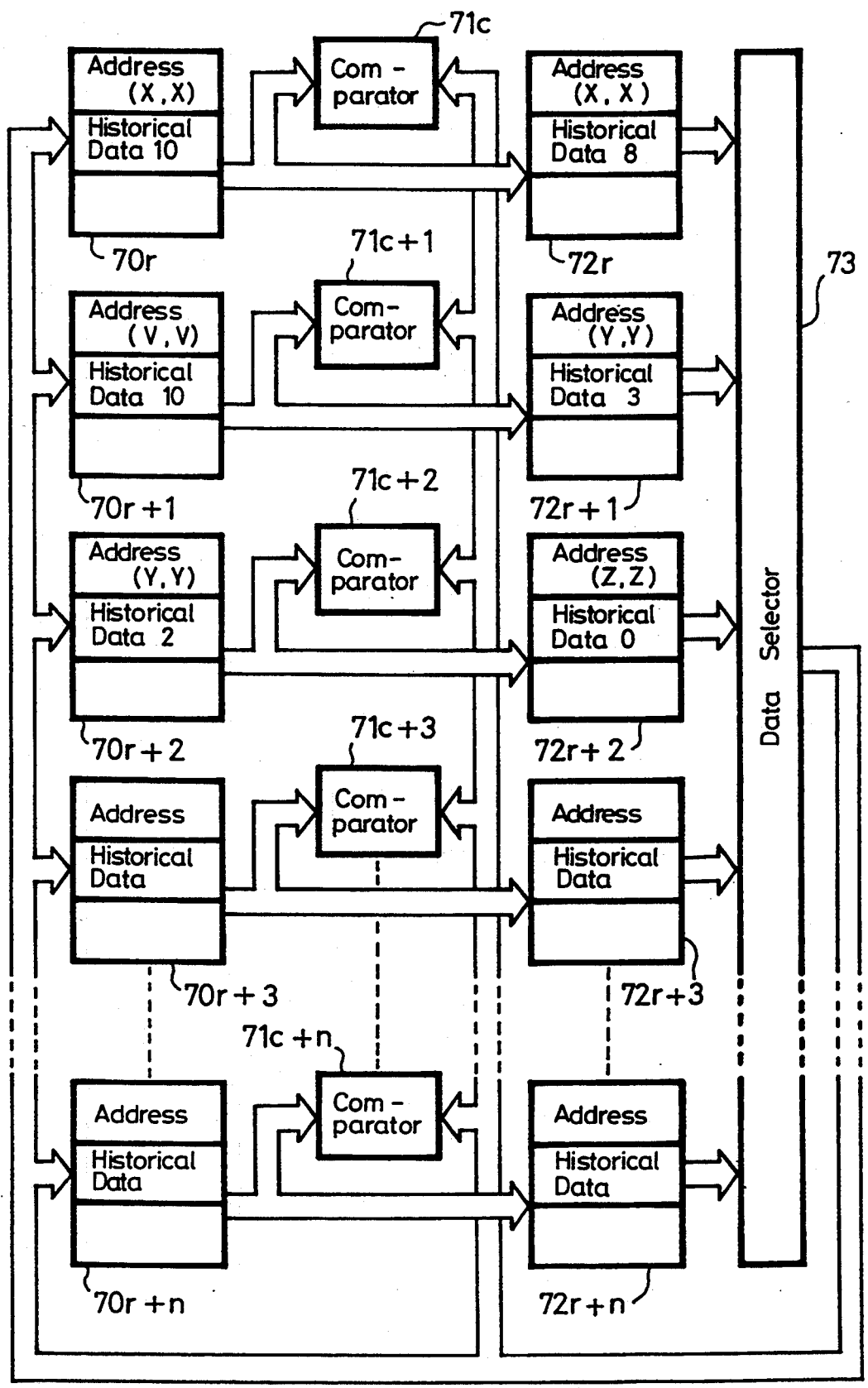

Thereafter, as indicated by a hatched signal line in FIG. 19, the content of the auxiliary register 72r+2 is read by the data selector 73, and the read defective pixel information is supplied to the comparators 71c, 71c+1, 71c+2, 71c+3, ..., 71c+n, which compare the supplied defective pixel information with the defective pixel information from the main registers 70r, 70r+1, 70r+2, 70r+3, ..., 70r+n.

In the example shown in FIG. 19, the address data of the defective pixel information stored in the auxiliary register 72r+2 is not the same as the address data of the defective pixel information stored in any of the main register 70r, 70r+1, 70r+2, 70r+3, ..., 70r+n. Therefore, any of the comparators 71c, 71c+1, 71c+2, 71c+3, ..., 71c+n do not respond, i.e., do not supply a signal to the system controller 4. At this time, the historical data "0" is stored in the historical data area of the auxiliary register 72r+2.

The historical data "0" stored in the historical data area of the auxiliary register 72r+2 indicates that the pixel stored as a defective pixel in the register has not been detected as a defective pixel successively ten times. In this case, the data of this defective pixel is not transferred to the main register 70r, 70r+1, 70r+2, 70r+3, ..., 70r+n.

In a next defect detecting process, the data stored in the main register 70r, 70r+1, 70r+2, 70r+3, ..., 70r+n is transferred to the auxiliary registers 72r, 72r+1, 72r+2, 72r+3, ..., 72r+n, replacing the data stored in the auxiliary registers 72r, 72r+1, 72r+2, 72r+3, ..., 72r+n. Thus, the data about the pixel that has not been detected as a defective pixel successively ten times is erased from the register. That is, the data of the defective pixel indicated by the address data (z, z) is erased.

If a pixel that was once detected as a defective pixel has not been detected as a defective pixel successively ten times in a defect detecting process, therefore, that pixel is not detected as a defective pixel. Furthermore, a normal pixel is prevented from being erroneously detected as a defective pixel due to noise.

In the above example, the historical data "10" of a pixel that was once detected as a defective pixel is successively decremented, and that pixel is not determined as a defective pixel when the historical data becomes "0". However, the historical data of a pixel may first be set to "0" and may then be incremented each time the pixel is not detected as a defective pixel, so that the pixel is not determined as a defective pixel when the historical data becomes "10".

A process of processing the contents of the register 14 shown in FIG. 3 depending on the temperature will be described below.

The register 14 shown in FIG. 3 stores various items of information of pixels that are detected as defective pixels. In this embodiment, two processes are selectively available for handling various information of defective pixels that have been detected in a preceding defect detecting process.

According to one of the two processes, all the information of defective pixels detected in the preceding defect detecting process is erased, and defective pixels are newly detected. According to the other process, defective pixels are corrected for with the preceding information thereof, and defective pixels are newly detected, with various information of the newly detected defective pixels being added to the preceding defective pixel information.

Defective pixels have positive temperature characteristics such that as the temperature becomes higher, the absolute value of the level of the output signal from a defective pixel becomes greater. According to the former process described above, since erroneous data produced by erroneous defect detection is erased, no erroneous data remains. However, if defective pixels are detected at lower temperatures after the erasure of the previous defect detection result, inasmuch as signals produced by the defective pixels are low in level, it may be possible not to detect defective pixels that would pose a problem at higher temperatures.

According to the latter process, as the data of defective pixels are not erased, even if defective pixels are detected at lower temperatures, any data of defective pixels that have been previously detected at higher temperatures are retained. Therefore, when information of defective pixels is not detected because of detection at lower temperatures, the previously detected data is maintained, posing no problem. However, if the previously detected data is produced by erroneous detection, then a problem arises because the data is not erased.

In this embodiment, the system controller 4 selects one of the above two available processes in each defect detecting process based on the temperature information from the temperature sensor 7 shown in FIG. 3. More specifically, when the temperature is lower, the system controller 4 employs the process for adding the information of defective pixels detected in a present defect detecting process to the previously detected data, and when the temperature is higher, the system controller 4 cancels the previously detected data.

In this manner, when the temperature is higher, the system controller 4 cancels the previously detected data, thus eliminating any erroneously detected data, and when the temperature is lower, the system controller 4 adds the information of presently detected defective pixels to the information of previously detected defective pixels, permitting defective pixels to be reliably detected at lower temperatures. Thus, the memory of limited storage capacity is effectively utilized, and defective pixels can reliably and accurately be detected for better defective pixel signal correction.

The control of the historical data in the register 14, described above with reference to FIGS. 12 through 20, may be combined with the above processes of canceling or adding the information of defective pixels depending on the temperature.

A correction control circuit 15 in the circuit shown in FIG. 3 will be described below. The correction control circuit 15 shown in FIG. 3 supplies a control signal to the timing generator 5 through the system controller 4 based on the temperature data from the temperature sensor 7 for varying the charge storage time of the CCD 2 in a range that is N times greater than the normal charge storage time.

More specifically, when the temperature of the CCD 2 is lower than a predetermined temperature, the number of sensor gate pulses supplied to the CCD 2 is reduced, e.g., one sensor gate pulse is supplied to the CCD 2 in several fields, thereby increasing the charge storage time. As a result, a video signal is outputted once in several fields, which causes no problem as the CCD 2 is in the mode of detecting defective pixels.

The correction control circuit 15 detects the temperature data supplied from the temperature sensor 7 through the system controller 4. If the detected temperature is lower than a predetermined temperature, then the correction control circuit 15 supplies a control signal through the system controller 4 to the timing generator 5 to increase the charge storage time of the CCD 2. If the detected temperature is higher than a predetermined temperature, then the correction control circuit 15 maintains the normal charge storage time of the CCD 2. The correction control circuit 15 may be supplied with the temperature data directly from the temperature sensor 7 via the pre-detection processing circuit 21.

The correction control circuit 15 compares the temperature data supplied from the temperature sensor 7 through the system controller 4 with reference temperature data. If the supplied temperature data is lower than the reference temperature data, then the correction control circuit 15 sets the control signal to be supplied to the correcting circuit 16 to a low level "0". If the supplied temperature data is higher than the reference temperature data, then the correction control circuit 15 sets the control signal to be supplied to the correcting circuit 16 to a high level "1".

As described later on, when the control signal is of the low level "0", i.e., when the temperature of the CCD 2 is relatively low, the gain of an amplifier in the correcting circuit 16 is varied to vary the levels of correcting signals supplied to the respective adders 9, 10, 11 shown in FIG. 3.

The correction control circuit 15 supplies a mask signal (i.e., an enable signal for an analog switch 88 in FIG. 21) to the analog switch 88 such that when the level of an output signal from a defective pixel becomes too high to be corrected by the correcting circuit due to a temperature rise, the signal from the defective pixel will not be corrected.

The correcting circuit 16 will be described in detail below with reference to FIG. 21.

Figure 21:
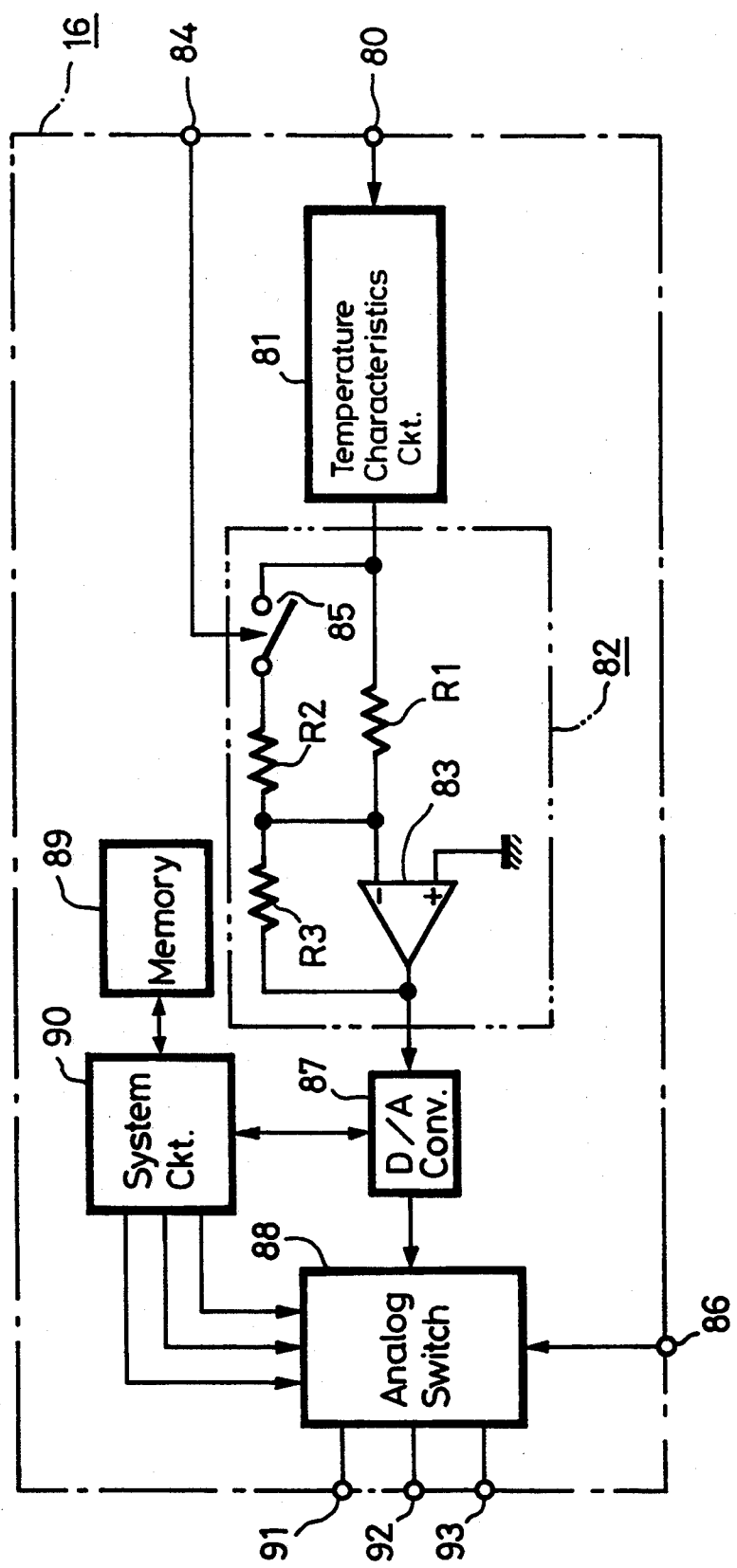
FIG. 21 is a block diagram of a correcting circuit in the circuit shown in FIG. 3.

As shown in FIG. 21, the correcting circuit 16 has an input terminal 84 for being supplied with the control signal from the correction control circuit 15, and a temperature converter 82 including a switch 85 that can be turned on or off by the control signal from the input terminal 84. The correcting circuit 16 also has an input terminal 80 for being supplied with the temperature information from the temperature sensor 7, the input terminal 80 being connected to an input terminal of a temperature characteristics circuit 81. The temperature characteristics circuit 81 converts the temperature information supplied from the input terminal 80 into temperature information that matches the characteristics of a small white flaw defect, i.e., a positive-polarity output signal among the output signals of defective pixels, and supplies the converted temperature information to the temperature converter 82.

The temperature converter 82 has an operational amplifier 83 having an inverting input terminal (−) connected through a resistor R1 to the output terminal of the temperature characteristics circuit 81. The output terminal of the operational amplifier 83 is connected to the junction between the resistor R1 and the temperature characteristics circuit 81 through a series-connected circuit of resistors R3, R2 and the switch 85. The junction between the resistors R3, R2 is connected to the inverting input terminal (−) of the operational amplifier 83, whose noninverting input terminal (+) is connected to ground.

As can be seen from FIG. 21, when the control signal supplied from the correction control circuit 15 through the input terminal 84 is of the low level "0", the switch 85 is closed, increasing the gain of the temperature converter 82. When the control signal is of the high level "1", the gain of the temperature converter 82 is lowered Therefore, the output signal from the temperature characteristics circuit 81 is amplified by the operational amplifier 83 with the gain set at the time. Thereafter, the amplified signal is supplied as a reference voltage to a reference voltage input terminal of a D/A converter 87. The D/A converter 87 converts the level data of a defective pixel that has been read from a memory 89, such as a ROM, by a system controller 90 into an analog correcting signal based on the reference voltage applied from the temperature converter 82, and supplies the analog correcting signal to the analog switch 88.

The memory 89 stores the above defective pixel level data and address data of the defective pixel level data. The system controller 90 supplies the defective pixel level data stored in the memory 89 to the D/A converter 87, and also supplies an address signal corresponding to the defective pixel level data, i.e., a pulse indicating which of the Gch, Rch, Bch signals is to be corrected, to the analog switch 88.

The analog switch 88 supplies the analog correcting signal from the D/A converter 87 to either one of the adders 9, 10, 11 shown in FIG. 3 through one of Gch, Rch, Bch output terminals 91, 92, 93 depending on an address signal from the system controller 90, and determines the supply of the correcting signal from the D/A converter 87 to the output terminal 91, 92, or 93 according to the mask signal supplied from the correction control signal 15 through an input terminal 86.

The mask signal will be described below. As described above with reference to FIGS. 9A through 9G, if the data level has an abnormal level pa, then the abnormal level pa would also be outputted from the sampling circuit 3. To avoid this, using a signal indicating the position of the abnormal level pa, the signal corresponding to the abnormal level pa among the sampling signals SHD is not outputted. That is, the output signal from the preceding pixel is held over the signal corresponding to the abnormal level pa.

If the first correction method is carried out by the sampling circuit 3, then the second correction method is effected by the correcting circuit 16. Therefore, any output signal that has been processed by the first correction method is subjected to the second correction method. To avoid this, the supply of the correcting signal from the D/A converter 87 to the output terminal 91, 92, or 93 is determined according to the mask signal that is supplied from the correction control signal 15 through the input terminal 86.

Operation of the correcting circuit 16 will be described below with reference to FIGS. 22A through 22F.

FIG. 22A shows an output signal from the sampling circuit 3 shown in FIG. 3. Hatched higher-level portions of the output signal are charge offsets having temperature dependency which have a level increasing in proportion to the storage time for photoelectric conversion. These charge offsets corresponding to defective pixel output signals having peculiar levels in a video signal.

If such a defective pixel has been detected in the manufacture of the CCD 2, then the output signal from the defective pixel can be canceled out by the second correction method which adds a correcting signal shown in FIG. 22B to the output signal shown in FIG. 22A from the CCD 2. Some defective pixels have their output signal levels varying with time. For example, as indicated by the broken line in FIG. 22A, the level of the output signal from a defective pixel increases with time as indicated by P20.

Even when the output signal from such a defective pixel is corrected according to the second correction method, however, the level increase P20 would appear as a peculiar level in the output signal. When the output signal from the defective pixel is then corrected according to the first correction method, the portion corresponding to the level increase P20 shown in FIG. 22A is replaced with a preceding output signal as shown in FIG. 22C.

Then, when the signal shown in FIG. 22C is corrected according to the second correction method using the signal waveform shown in FIG. 22B, an output level having the opposite polarity to the level increase P20 would appear as shown hatched in FIG. 22D.

In this embodiment, the correction control circuit 15 generates a mask signal composed of two clock pulses, for example, as shown in FIG. 22E, and supplies the mask signal through the input terminal 86 to the analog switch 88. The analog switch 88 does not produce an output signal when the mask signal shown in FIG. 22E is of a high level "1", so that a level P21 having the opposite polarity to the level increase P20 does not appear in the final output signal as indicated by the broken lines in FIG. 22F.

Therefore, the output signal from a defective pixel whose level varies with temperature can accurately be corrected. The output signal from a defective pixel can thus be corrected well with accuracy.

As described above, the correcting circuit 16 is arranged to vary the gain of the temperature converter 82 shown in FIG. 21 based on the control signal (switching signal) from the correction control circuit 15.

Such a gain varying process will be described below with reference to FIGS. 23A through 23F.

Figure 23A:
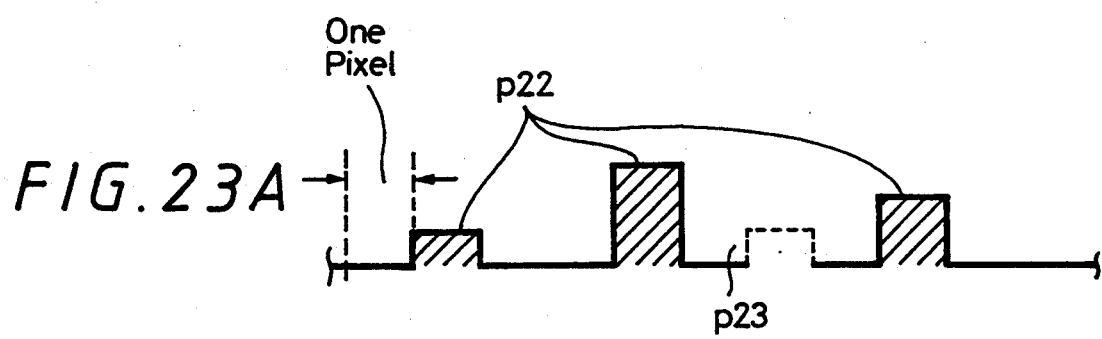
FIGS. 23A through 23F are diagrams showing the manner in which the gain of a temperature converter in the correcting circuit shown in FIG. 21 is varied by a control signal from a correction control circuit.

FIG. 23A shows an output signal from the sampling circuit 3 shown in FIG. 3. Hatched higher-level portions P22 of the output signal are defective pixel output signals which have a level increasing in proportion to the storage time for photoelectric conversion.

Figure 23B:
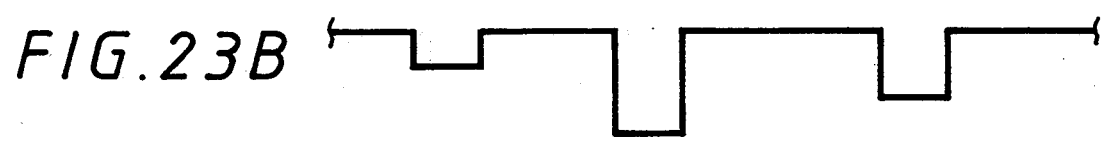
Figure 23C:
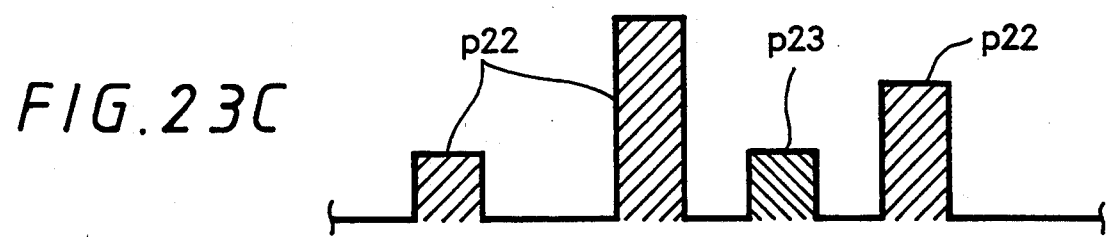
Figure 23D:
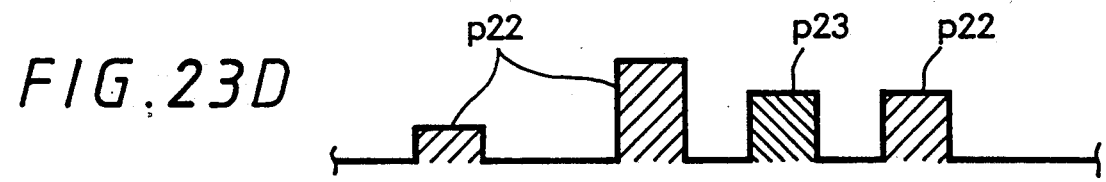

The defective pixel output signals can be canceled out by adding a signal waveform shown in FIG. 23B to the output signal waveform shown in FIG. 23A. It is assumed that a sudden output signal having a peculiar level P23 is produced, e.g., a normal pixel suddenly produces an output signal having a peculiar level that is determined as a defective pixel output signal, and such a defective pixel output signal is to be corrected. If the charge storage time is longer than the normal charge storage time, i.e., is twice the normal charge storage time, then the defective pixel output levels P22, P23 shown in FIG. 23A are doubled as shown in FIG. 23C.

If the defective pixel output signals were corrected with the signal waveform shown in FIG. 23B, then the defective pixel output level P23 and also the defective pixel output levels P22 that have been canceled out in the normal correction process would appear in the final output signal, and would be detected as defective pixels.

Figure 23E:
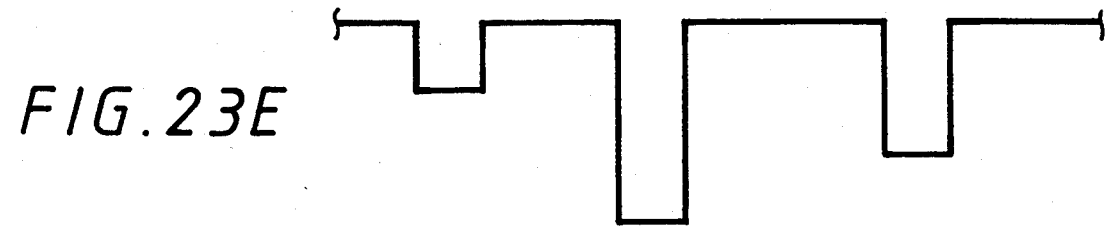
Figure 23F:
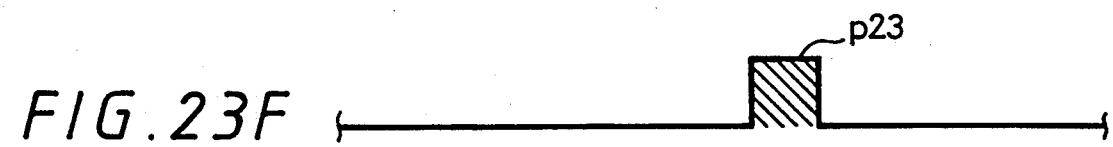

In this embodiment, the switch 85 shown in FIG. 21 is turned off by the control signal from the correction control circuit 15 to increase the gain of the temperature converter 82 for thereby increasing the reference voltage of the D/A converter 87 to a level twice the normal level, for example. Thus, the defective pixel output signal level from the system controller 90 is doubled as shown in FIG. 23E.

In this manner, only a signal portion corresponding to the new defective pixel output level P23 remains to be corrected. Accordingly, the output signal from a sudden defective pixel can appropriately be detected and corrected, so that defective pixel output signals can well be detected and corrected. The output signals from defective pixels that are not to be detected are not detected in error.

The pre-detection processing circuit 21 shown in FIG. 3 will be described below with reference to FIG. 24.

Figure 24:
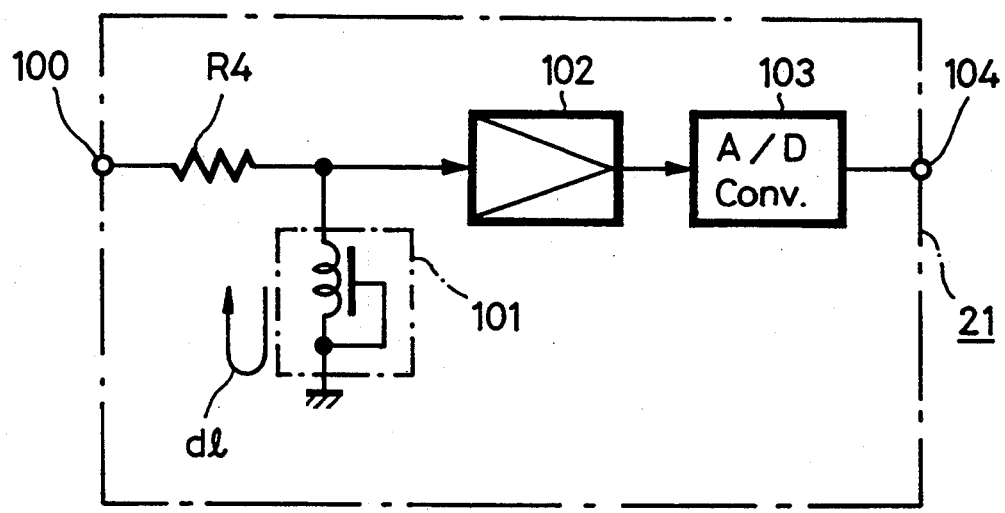
FIG. 24 is a block diagram of a pre-detection processing circuit in the circuit shown in FIG. 3.

As shown in FIG. 24, the pre-detection processing circuit 21 has an input terminal 100 for being supplied with a signal from the movable contact 20e of the switch 20 shown in FIG. 3, i.e., the signal from the adder 9, 10, or 11 or the temperature information from the temperature sensor 7. The signal supplied from the input terminal 100 is supplied through a resistor R4 to an amplifier 102 and a delay element 101.

The pre-detection processing circuit 21 mainly serves to reduce a detection error owing to components of a sampling frequency. The resistor R4 and the delay element 101 remove a carrier component from an input signal which may be detected in error, and the input signal from which the carrier component has been removed is amplified by the amplifier 102 having a gain of several tens. The amplified input signal is converted by an A/D converter 103 into a digital signal, which is supplied through an output terminal 104 to the detecting circuit 22 shown in FIG. 3. The pre-detection processing circuit 21 is capable of supplying the detecting circuit 15 with a level of several mV, for example, to be detected even if that level is added to a carrier component of 100 mVp-p. While it would be possible to amplify and detect discrete signal portions, such an alternative would not be preferred because the amplified signal would exceed an output voltage range of the amplifier as the carrier component would also be amplified.

Operation of the pre-detection processing circuit 21 will be described below with reference to FIGS. 25A through 25F.

When the input terminal 100 of the pre-detection processing circuit 21 is supplied with an input signal including higher-level portions P30, shown hatched in FIG. 25A, due to defective pixel output signals, if the delay element 101 is impedance-matched, the signal that has passed through the resistor R4 has higher-level portions P31 shown hatched in FIG. 25B.

When the signal shown in FIG. 25B is delayed by the delay element 101, the signal is inverted in phase at a point indicated by the arrow d1 in FIG. 24, and the higher-level portions P31 as well as other portions of the reflected waveform are also inverted in phase and delayed for a time corresponding to one period, as shown in FIG. 25C.

Therefore, the signal supplied to the amplifier 102 has a waveform which is the sum of the waveforms shown in FIGS. 25B and 25C, as shown in FIG. 25D, the waveform having the portions P31 and P32 extracted as shown hatched. The signal shown in FIG. 25D is then amplified by the amplifier 102 to a voltage level in excess of a threshold level Th that is high enough for the detecting circuit 22 to determine defective pixels. The amplified voltage is then converted by the A/D converter 103 into a digital signal, which is supplied to the detecting circuit 22.

Therefore, only an output signal produced by defective pixels can accurately be extracted, and hence the defective pixels can well be detected and corrected for. The temperature information from the temperature sensor 7 may be converted by another A/D converter into a digital signal, which may directly be supplied to various circuits which require the temperature information.

The detecting circuit 22 shown in FIG. 3 will be described below with reference to FIG. 26.

Figure 26:
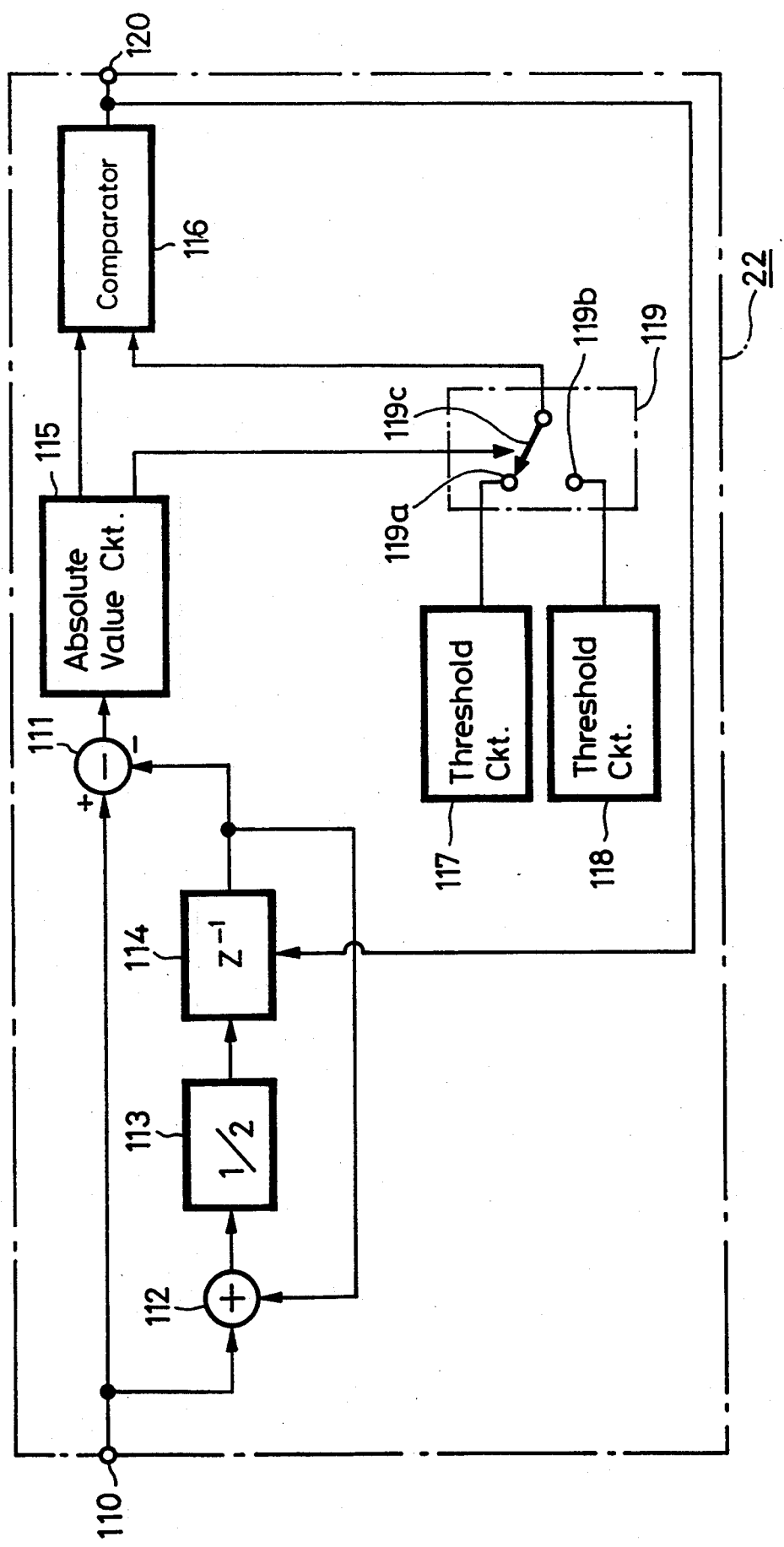
FIG. 26 is a block diagram of a detecting circuit in the circuit shown in FIG. 3.

As shown in FIG. 26, the detecting circuit has an input terminal 110 for being supplied with the digital signal from the pre-detection processing circuit 21. The digital signal from the input terminal 110 is supplied to an adder 112 and a subtractor 111.

The adder 112 adds the input signal from the input terminal 110 and a signal that has been fed back. The sum signal from the adder 112 is supplied through a time-constant circuit 113 to a flip-flop circuit 114. The flip-flop circuit 114 supplies an output signal from the time-constant circuit 113 to the subtractor 111 based on an output signal from a comparator 116, and feeds the output signal back to the adder 112. The adder 112, the time-constant circuit 113, and the flip-flop circuit 114 jointly constitute a low-pass filter. Therefore, the output signal from the flip-flop circuit 114 is a DC signal of a level that is the average of signals from nearby pixels, the DC signal being free from spikes and other noise contained in the original input signal.

The output signal from the flip-flop circuit 114 is supplied to the subtractor 111, which deduces the output signal of the flip-flop circuit 114 from the input signal supplied from the input terminal 110, i.e., the signal that possibly be a defective pixel output signal. The differential signal produced by the subtractor 111 is then supplied to an absolute value circuit 115, which produces a signal indicative of the absolute value of the supplied signal. Specifically, after converting the polarities of the levels of white and black flaw defects indicated by defective pixel output signals into the same polarity, the absolute value circuit 115 supplies these signals to the comparator 116, and determines whether the signal from the subtractor 111 is produced by a white flaw defect or a black flaw defect. Depending on whether the signal from the subtractor 111 is produced by a white flaw defect or a black flaw defect, the absolute value circuit 115 generates a control signal (flag), and supplies the control signal to a switch 119 to shift its movable contact.

The switch 119 has a fixed contact 119a connected to the output terminal of a threshold circuit 117 which outputs a threshold signal of positive polarity, a fixed contact 119b connected to the output terminal of a threshold circuit 118 which outputs a threshold signal of negative polarity, and a movable contact 119 connected to one of the input terminals of the comparator 116.

The switch 119 selectively supplies the threshold level from the threshold circuit 117 which generates a threshold level (positive signal) corresponding to white flaw defects and the threshold level from the threshold circuit 118 which generates a threshold level (negative signal) corresponding to black flaw defects to the comparator 116 depending on the control signal supplied from the absolute value circuit 115. The threshold circuits 117, 118 may be of a circuit arrangement which has a reading circuit for reading threshold level data stored in a memory and a D/A converter for converting the threshold level data into an analog signal, or may be of a circuit arrangement which produces an analog voltage, or may comprise a circuit within the system controller 4.

The comparator 116 compares the absolute value signal from the absolute value circuit 115 and the threshold level signal supplied from the threshold circuit 117 or 118 through the switch 119. If the absolute value signal is larger than the threshold level signal, then the comparator 116 determines the pixel output signal as being a defective pixel output signal. The comparator 116 supplies a control signal to the flip-flop circuit 114 to prevent the defective pixel output signal from being applied to the flip-flop circuit 114. This is because if the defective pixel output signal were used to produce a signal level which is the average of output signals from nearby pixels, then the average value would be disturbed.

The manner in which the low-pass filter composed of the adder 112, the time-constant circuit 113, and the flip-flop circuit 114 operates to produce the average of output signals from nearby pixels will be described below.

The low-pass filter outputs the weighted mean of output signals from pixels that precede a certain pixel in the horizontal direction. It is assumed that the horizontal address indicates a pixel k. If the output level of the pixel whose address is k is indicated by Pk, the output signal Pkm of the low-pass filter at the address k, i.e., the level which is the average of output signals from nearby pixels, is indicated by $(\frac{1}{2}Pk-1)+(\frac{1}{4}Pk-2)+(\frac{1}{8}Pk-3)+(1/16Pk-4)+...+\{(nth\ power\ of\ \frac{1}{2})Pk-n+...$ . Therefore, the output signal Pkm of the low-pass filter is effectively the weighted mean of several pixels prior to the pixel indicated by the horizontal address.

The detecting circuit 22 operates as follows:

The digital signal supplied from the pre-detection processing circuit 21 through the input terminal 110 is supplied to the adder 112 and the subtractor 111. The output signal from the adder 112 is supplied through the time-constant circuit 113 to the flip-flop circuit 114.

When the output signal from the subtractor 111 is supplied to the absolute value circuit 115, the absolute value circuit 115 detects the polarity of the supplied signal, determines whether the supplied signal is produced by a white or black flaw defect based on the detected polarity, supplies a control signal to the switch 119, and converts the supplied signal to absolute value data and supplies the absolute value data to the comparator 116.

Based on the control signal from the absolute value circuit 115, the switch 119 shifts the movable contact 119c into contact with the fixed contact 119a or 119b. As a result, the positive (white flaw defect) threshold level signal is read from the threshold circuit 117 or the negative (black flaw defect) threshold level signal is read from the threshold circuit 118, and the read threshold level signal is applied to the comparator 116.

The comparator 116 compares the absolute value data from the absolute value circuit 115 and the threshold level signal supplied from the threshold circuit 117 or 118. If the absolute value data is greater than the threshold level signal, then the comparator 116 determines the pixel as a defective pixel. The comparator 116 supplies a signal indicative of the detection of a defective pixel through an output terminal 120 to the system controller 4 shown in FIG. 3, and also supplies a control signal to the flip-flop circuit 114 to prevent the signal from being applied from the time-constant circuit 113 to the flip-flop circuit 114. In this fashion, the level indicative of the average of output signals from nearby pixels is prevented from being disturbed by the defective pixel output signal.

As described above, the detecting circuit 22 determines whether a signal to be detected is caused by a black flaw defect owing to a negative output signal from a defective pixel or a white flaw defect owing to a positive output signal from a defective pixel. If the signal is caused by a white flaw defect, then the detecting circuit 22 determines whether the signal is produced by a defective pixel output signal using the threshold level signal for white flaw defects. If the signal is caused by a black flaw defect, then the detecting circuit 22 determines whether the signal is produced by a defective pixel output signal using the threshold level signal for black flaw defects. Therefore, the detecting circuit 22 can well detect defective pixel output signals while preventing erroneous detection due to spikes and other noise.

In this embodiment, as described above, when the detecting mode switch selects the mode for detecting a defective pixel, the reading mode switches to the frame reading mode even when the reading mode selector switch 23 selects the field reading mode. If the circuit according to the present invention is incorporated in a video camera capable of switching between the field reading mode and the frame reading mode, then the frame reading mode with good vertical resolution is automatically selected when defective pixels are to be detected, thus allowing defective pixels to be detected accurately.

Having-described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A solid-image pickup apparatus having a defect detecting mode comprising;
    a solid-state image sensor having pixels arranged in rows and columns for producing an output signal representing a detected image;
    drive means for driving said solid-state image sensor in a field reading mode and a frame reading mode, in said field reading mode an electric charge from each of said pixels being read every field period such that electric charges from pixels of each of pairs of two adjacent rows in each column are respectively summed before being outputted from said solid-state image sensor, the two adjacent rows whose pixels are summed being changed as a field changes, and in said frame reading mode an electric charge from each of said pixels being read every frame period such that electric charges from the pixels of one of odd-numbered and even-numbered rows are read in even-numbered fields and electric charges of the pixels of the other rows are read in odd-numbered fields;
    switch means for selecting a defect detecting mode;
    detecting means for detecting the positions of defective pixels of said solid-state image sensor in said defect detecting mode;
    memory means for storing position data of said defective pixels detected by said detecting means;
    control means for controlling said drive means so that said solid-state image sensor is driven in said frame reading mode when said switch means selects said defect detecting mode;
    a temperature sensor for detecting the temperature of said solid-state image sensor, wherein said drive means drives said solid-state image sensor in said defect detecting mode in a manner such that when the detected temperature is lower than a predetermined temperature the electric charges are read once from said pixels in a period longer than the frame period.

2. A solid-image pickup apparatus having a defect detecting mode comprising;
    a solid-state image sensor having pixels arranged in rows and columns for producing an output signal representing detected image;
    drive means for driving said solid-state image sensor in a field reading mode and a frame reading mode, in said field reading mode an electric charge from each of said pixels being read every field period such that electric charges from pixels of each of pairs of two adjacent rows in each column are respectively summed before being outputted from said solid-state image sensor, the two adjacent rows whose pixels are summed being changed as a field changes, and in said frame reading mode an electric charge from each of said pixels being read every frame period such that electric charges from the pixels of one of odd-numbered and even-numbered rows are read in even-numbered fields and electric charges of the pixels of the other rows are read in odd-numbered fields;

switch means for selecting a defect detecting mode;

detecting means for detecting the positions of defective pixels of said solid-state image sensor in said defect detecting mode;

memory means for storing position data of said defective pixels detected by said detecting means;

control means for controlling said drive means so that said solid-state image sensor is driven in said frame reading mode when said switch means selects said defect detecting mode;

a temperature sensor for detecting the temperature of said solid-state image sensor; and means for varying a threshold level used to detect said defective pixels by said detecting means, depending on the temperature detected by said temperature sensor.

3. A solid-image pickup apparatus having a defect detecting mode comprising;

a solid-state image sensor having pixels arranged in rows and columns for producing an output signal representing a detected image;

drive means for driving said solid-state image sensor in a field reading mode and a frame reading mode, in said field reading mode an electric charge from each of said pixels being read every field period such that electric charges from pixels of each of pairs of two adjacent rows in each column are respectively summed before being outputted from said solid-state image sensor, the two adjacent rows whose pixels are summed being changed as a field changes, and in said frame reading mode an electric charge from each of said pixels being read every frame period such that electric charges from the pixels of one of odd-numbered and even-numbered rows are read in even-numbered fields and electric charges of the pixels of the other rows are read in odd-numbered fields;

switch means for selecting a defect detecting mode;

detecting means for detecting the positions of defective pixels of said solid-state image sensor in said defect detecting mode;

memory means for storing position data of said defective pixels detected by said detecting means;

control means for controlling said drive means so that said solid-state image sensor is driven in said frame reading mode when said switch means selects said defect detecting mode;

a temperature sensor for detecting the temperature of said solid-state image sensor; and means for erasing the position data of said defective pixels previously detected and stored in said memory means when the temperature detected by said temperature sensor is higher than a predetermined temperature in said defect detecting mode.

4. A solid-image pickup apparatus having a defect detecting mode comprising;

a solid-state image sensor having pixels arranged in rows and columns for producing an output signal representing a detected image;

drive means for driving said solid-state image sensor in a field reading mode and a frame reading mode, in said field reading mode an electric charge from each of said pixels being read every field period such that electric charges from pixels of each of pairs of two adjacent rows in each column are respectively summed before being outputted from said solid-state .image sensor, the two adjacent rows whose pixels are summed being changed as a field changes, and in said frame reading mode an electric charge from each of said pixels being read every frame period such that electric charges from the pixels of one of odd-numbered and even-numbered rows are read in even-numbered fields and electric charges of the pixels of the other rows are read in odd-numbered fields;

switch means for selecting a defect detecting mode;

detecting means for detecting the positions of defective pixels of said solid-state image sensor in said defect detecting mode;

memory means for storing position data of said defective pixels detected by said detecting means;

control means for controlling said drive means so that said solid-state image sensor is driven in said frame reading mode when said switch means selects said defect detecting mode; and means for forcibly stopping an electronic shutter to control an electric charge storage time of said solid-state image sensor in said defect detecting mode.

5. A solid-image pickup apparatus having a defect detecting mode comprising;

a solid-state image sensor having pixels arranged in rows and columns for producing an output signal representing a detected image;

drive means for driving said solid-state image sensor in a field reading mode and a frame reading mode, in said field reading mode an electric charge from each of said pixels being read every field period such that electric charges from pixels of each of pairs of two adjacent rows in each column are respectively summed before being outputted from said solid-state image sensor, the two adjacent rows whose pixels are summed being changed as a field changes, and in said frame reading mode an electric charge from each of said pixels being read every frame period such that electric charges from the pixels of one of odd-numbered and even-numbered rows are read in even-numbered fields and electric charges of the pixels of the other rows are read in odd-numbered fields;

switch means for selecting a defect detecting mode;

detecting means for detecting the positions of defective pixels of said solid-state image sensor in said defect detecting mode;

memory means for storing position data of said defective pixels detected by said detecting means;

control means for controlling said drive means so that said solid-state image sensor is driven in said frame reading mode when said switch means selects said defect detecting mode; and means for erasing the position data of a pixel previously detected as defective and stored in said memory means when a defect is not detected for that pixel a predetermined number of times in succeeding defect detection operations, said predetermined number being greater than one.

6. A solid-image pickup apparatus having a defect detecting mode comprising:
a plurality of solid-state image sensors each having pixels arranged in rows and columns for producing an output signal of a different color representing a single detected image;
drive means for driving said solid-state image sensors in a field reading mode and a frame reading mode, in said field reading mode an electric charge from each of said pixels being read every field period such that electric charges from pixels of each of pairs of two adjacent rows in each column are respectively summed before being outputted from said solid-state image sensors, the two adjacent rows whose pixels are summed being changed as a field changes, and in said frame reading mode an electric charge from each of said pixels being read every frame period such that electric charges from the pixels of one of odd-numbered and even-numbered rows are read in even-numbered fields and electric charges of the pixels of the other rows are read in odd-numbered fields;
switch means for selecting a defect detecting mode;
detecting means for detecting the positions of defective pixels of said solid-state image sensors in said defect detecting mode, said detecting means comprising a plurality of sample-hold circuits each corresponding to one of said solid-state image sensors for sampling and holding the output signal of the corresponding one of said solid-state image sensors;
enabling disabling means for enabling only one of said sample-hold circuits to sample-hold the corresponding one of the outputs of said solid-state image sensors at a time and for disabling the other sample-hold circuits;
memory means for storing position data of said defective pixels detected by said detecting means; and
control means for controlling said drive means so that said solid-state image sensors are driven in said frame reading mode when said switch means selects said defect detecting mode.

7. A solid-image pickup apparatus having a defect detecting mode comprising:
a solid-state image sensor having pixels arranged in rows and columns for producing an output signal representing a detected image;
reading means for reading an electric charge from each of said pixels;
detecting means for detecting the positions of defective pixels of said solid-state image sensor in said defect detecting mode, the electric charges being read once from said pixels in a predetermined period in said defect detecting mode;
memory means for storing position data of said defective pixels detected by said detecting means; and
a temperature sensor for detecting the temperature of said solid-state image sensor, wherein said reading means reads the electric charges from said pixels once in a longer period than said predetermined period when the detected temperature is lower than a predetermined temperature in said defect detecting mode.

8. A solid-image pickup apparatus having a defect detecting mode comprising:
a solid-state image sensor having pixels arranged in rows and columns for producing an output signal representing a detected image;
reading means for reading an electric charge from each of said pixels;
detecting means for detecting the positions of defective pixels of said solid-state image sensor in said defect detecting mode;
memory means for storing position data of said defective pixels detected by said detecting means;
a temperature sensor for detecting the temperature of said solid-state image sensor; and
means for varying a threshold level used to detect said defective pixels by said detecting means, depending on the temperature detected by said temperature sensor.

9. A solid-image pickup apparatus having a defect detecting mode comprising:
a solid-state image sensor having pixels arranged in rows and columns for producing an output signal representing a detected image;
reading means for reading an electric charge from each of said pixels;
detecting means for detecting the positions of defective pixels of said solid-state image sensor in said defect detecting mode;
memory means for storing position data of said defective pixels detected by said detecting means;
a temperature sensor for detecting the temperature of said solid-state image sensor; and
means for erasing the position data of said defective pixels previously detected and stored in said memory means when the temperature detected by said temperature sensor is higher than a predetermined temperature in said defect detecting mode.

10. A solid-image pickup apparatus having a defect detecting mode comprising:
a solid-state image sensor having pixels arranged in rows and columns for producing an output signal representing a detected image;
reading means for reading an electric charge from each of said pixels;
detecting means for detecting the positions of defective pixels of said solid-state image sensor in said defect detecting mode;
memory means for storing position data of said defective pixels detected by said detecting means; and
means for forcibly stopping an electronic shutter to control an electric charge storage time of said solid-state image sensor in said defect detecting mode.

11. A solid-image pickup apparatus having a defect detecting mode comprising:
a solid-state image sensor having pixels arranged in rows and columns for producing an output signal representing a detected image;
reading means for reading an electric charge from each of said pixels;
detecting means for detecting the positions of defective pixels of said solid-state image sensor in said defect detecting mode;
memory means for storing position data of said defective pixels detected by said detecting means; and
means for erasing the position data of a pixel previously detected as defective and stored in said memory means when a defect is not detected for that pixel a predetermined number of times in succeeding defect detection operations, said predetermined number being greater than one.

12. A solid-image pickup apparatus having a defect detecting mode comprising:

a plurality of solid-state image sensors each having pixels arranged in rows and columns for producing an output signal of a different color representing a single detected image;

reading means for reading an electric charge from each of said pixels;

detecting means for detecting the positions of defective pixels of said solid-state image sensors in said defect detecting mode, said detecting means comprising a plurality of sample-hold circuits each corresponding to one of said solid-state image sensors for sampling and holding the output signal of the corresponding one of said solid-state image sensors;

means for enabling only one of said sample-hold circuits to sample-hold the corresponding one of the outputs of said solid-state image sensors at one time so that the other sample-hold circuits are disabled; and memory means for storing position data of said defective pixels detected by said detecting means.

* * * * *